(12) United States Patent
Murthi et al.

(10) Patent No.: US 10,007,330 B2
(45) Date of Patent: Jun. 26, 2018

(54) REGION OF INTEREST SEGMENTATION

(75) Inventors: Raghu Murthi, Bellevue, WA (US);
Steven Bathiche, Kirkland, WA (US);
John Allen Tardif, Sammamish, WA (US); Nicholas Robert Baker, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1023 days.

(21) Appl. No.: 13/164,785

(22) Filed: Jun. 21, 2011

(65) Prior Publication Data

US 2012/0326959 A1    Dec. 27, 2012

(51) Int. Cl.
*G06F 3/01*    (2006.01)
*G06K 9/20*    (2006.01)
*H04H 60/45*   (2008.01)
*G06F 3/00*    (2006.01)

(52) U.S. Cl.
CPC .............. *G06F 3/011* (2013.01); *G06F 3/005* (2013.01); *G06K 9/209* (2013.01); *H04H 60/45* (2013.01)

(58) Field of Classification Search
CPC .................................................... G06T 11/001
USPC ......... 345/158, 473–475, 581–589; 715/849; 348/77, 153–155; 382/103, 154, 298, 382/299, 162–167, 173–180, 190–195, 382/199, 244–228, 286–297, 317
See application file for complete search history.

(56) References Cited

U.S. PATENT DOCUMENTS

| 4,551,680 | A | 11/1985 | Macovski |
| 4,708,473 | A | 11/1987 | Metzdorff et al. |
| 6,057,909 | A | 5/2000 | Yahav et al. |
| 6,340,114 | B1 | 1/2002 | Correa et al. |
| 7,044,908 | B1 | 5/2006 | Montalbo et al. |
| 7,293,714 | B2 | 11/2007 | Zhu et al. |

(Continued)

FOREIGN PATENT DOCUMENTS

| CN | 103763552 A | 4/2014 |
| WO | 2015001550 A1 | 1/2015 |

OTHER PUBLICATIONS

Yasuda, et al., "Thermo-Key: Human Region Segmentation from Video", Retrieved at << http://ieeexplore.ieee.org/stamp/stamp.jsp?tp=&arnumber=1255805 >>, Computer Graphics and Applications, IEEE, vol. 24 No. 1, Jan./Feb. 2004, pp. 26-30.

(Continued)

*Primary Examiner* — Gustavo Polo
(74) *Attorney, Agent, or Firm* — Holzer Patel Drennan

(57) ABSTRACT

A sensor manager provides dynamic input fusion using thermal imaging to identify and segment a region of interest. Thermal overlay is used to focus heterogeneous sensors on regions of interest according to optimal sensor ranges and to reduce ambiguity of objects of interest. In one implementation, a thermal imaging sensor locates a region of interest that includes an object of interest within predetermined wavelengths. Based on the thermal imaging sensor input, the regions each of the plurality of sensors are focused on and the parameters each sensor employs to capture data from a region of interest are dynamically adjusted. The thermal imaging sensor input may be used during data pre-processing to dynamically eliminate or reduce unnecessary data and to dynamically focus data processing on sensor input corresponding to a region of interest.

20 Claims, 13 Drawing Sheets

(56) References Cited

U.S. PATENT DOCUMENTS

| | | | |
|---|---|---|---|
| 7,298,397 | B2 | 11/2007 | Cooper et al. |
| 7,574,021 | B2 | 8/2009 | Matey |
| 7,593,550 | B2 | 9/2009 | Hamza |
| 7,787,688 | B1 | 8/2010 | Kass |
| 8,121,356 | B2 | 2/2012 | Friedman et al. |
| 8,265,347 | B2 | 9/2012 | Zhang et al. |
| 2003/0035051 | A1* | 2/2003 | Cho et al. ............ 348/169 |
| 2005/0084179 | A1 | 4/2005 | Hanna et al. |
| 2009/0046157 | A1* | 2/2009 | Cilia et al. ............ 348/207.1 |
| 2009/0080715 | A1 | 3/2009 | van Beek et al. |
| 2009/0251530 | A1* | 10/2009 | Cilia ............ 348/39 |
| 2010/0141767 | A1* | 6/2010 | Mohanty et al. ............ 348/159 |
| 2010/0194872 | A1 | 8/2010 | Mathe et al. |
| 2010/0199230 | A1 | 8/2010 | Latta et al. |
| 2010/0208029 | A1 | 8/2010 | Marti et al. |
| 2010/0231512 | A1 | 9/2010 | Perez et al. |
| 2010/0277489 | A1 | 11/2010 | Geisner et al. |
| 2010/0278431 | A1 | 11/2010 | Mathe et al. |
| 2010/0281432 | A1 | 11/2010 | Geisner et al. |
| 2011/0032334 | A1 | 2/2011 | Raveendran et al. |
| 2011/0058709 | A1 | 3/2011 | Kipman et al. |
| 2011/0304720 | A1* | 12/2011 | Kumar et al. ............ 348/77 |
| 2012/0050264 | A1 | 3/2012 | Karaoguz et al. |
| 2013/0093922 | A1 | 4/2013 | Mowry |
| 2014/0225978 | A1 | 8/2014 | Saban et al. |
| 2015/0002682 | A1 | 1/2015 | Tran |

OTHER PUBLICATIONS

Lyon, et al., "Eyeing the Camera: Into the Next Century", Retrieved at << http://citeseerx.ist.psu.edu/viewdoc/download?doi=10.1.1.102.6377&rep=rep1&type=pdf >>, In Proceedings of IS&T/SID 10th Color Imaging Conference, vol. 17 No. 6, Dec. 2002, pp. 1-16.

Klein, et al., "Visual Computing for Medical Diagnosis and Treatment", Retrieved at << http://yp.bmt.tue.nl/pdfs/10951.pdf >>, vol. 33 No. 4, Aug. 2009, pp. 554-565.

Braga, Matt., "Deep Dive into the Technical Side of Microsoft's Xbox Kinect", Retrieved at << http://www.tested.com/news/deep-dive-into-the-technical-side-of-microsofts-xbox-kinect/702/?page=2&sort=first >>, Aug. 12, 2010, pp. 1-4.

"Xbox Kinect: How the Movement Tracking Works", Retrieved at << http://www.fixyourxbox.com/2010/10/xbox-kinect-how-the-movement-tracking-works/ >>, Retrieved Date: Mar. 25, 2011, pp. 1-6.

Kleihorst, et al., "Architecture and Applications of Wireless Smart Cameras (Networks)", Retrieved at << http://ieeexploreieee.org/stamp/stamp.jsp?tp=&arnumber=4218365&isnumber4218011 >>, Apr. 15-20, 2007, pp. 1373-1376.

Casares, et al., "Power consumption and performance analysis of object tracking and event detection with wireless embedded smart cameras", Retrieved at << http://ieeexplore.ieee.org/stamp/stamp.jsp?tp=&arnumber=5306375&isnumber=5306325 >>, Sep. 28-30, 2009, pp. 8.

"Object Tracking Using a Wireless Camera Network", Retrieved at << http://cobweb.ecn.purdue.edu/RVL/Research/WirelessCameras/index.html >>, Retrived Date: Mar. 25, 2011, pp. 5.

Yeo, et al., "Robust distributed multi-view video compression for wireless camera networks", Retrieved at << http://citeseerx.ist.psu.edu/viewdoc/download?doi=10.1.91.1316&rep=rep1&type=pdf>>, Retrieved Date: Mar. 28, 2011, pp. 9.

"A High Depth of Field Omnidirectional Video Camera With Selective High Resolution Imaging Capability", Retrieved on: Jul. 13, 2015, Available at: https://www.sbir.gov/sbirsearch/detail/173949.

* cited by examiner

REGION OF INTEREST SEGMENTATION

CROSS-REFERENCE TO RELATED APPLICATIONS

The present application is related to U.S. patent application Ser. No. 13/164,783 filed Jun. 21, 2011, entitled "Resource Conservation based on a Region of Interest" which is specifically incorporated by reference herein for all that it discloses and teaches.

BACKGROUND

Modern multimedia environments generally employ a variety of sensor or data inputs. For example, a gaming environment may include a red-green-blue (RGB) camera to capture an image of a player in a gaming scene and a depth camera to detect the distance between the depth camera and various points in the gaming scene, including points on the player. In this manner, the multimedia environment can determine and interpret characteristics in the captured scene.

In some multimedia applications, the effectiveness of a given sensor is limited to a particular range or condition. For example, in an intense ambient light scenario, an RGB light sensor tends to saturate, and in low ambient light scenarios, an RGB light sensor may not effectively capture sufficient data to locate and process a dark region of interest. To address these performance issues, the resolution or sensitivity of one or more sensors may be adjusted. However, such adjustments can impact other aspects of performance. For example, increasing the resolution of one or more sensors can increase the amount of data captured and increase the computational requirements and/or increase the latency in the multimedia environment.

Additionally, in the context of locating and tracking an object of interest, such as a human user, data captured by a sensor may be ambiguous. The captured sensor data may result in a false positive, which identifies and tracks a non-existent human user, or a false negative, which fails to identify an existing human user. For example, in multimedia environments with RGB or depth sensor based tracking systems, inanimate objects and animals may result in a false positive in conditions outside the optimal RGB and depth sensor ranges. Additionally, a human user may blend into surrounding objects (e.g., a couch), resulting in a false negative. Accordingly, existing multimedia environments may not under certain conditions efficiently focus sensor resources on regions of interest or adequately reduce the ambiguity of objects of interest.

SUMMARY

Implementations described and claimed herein address the foregoing problems by providing dynamic input fusion to identify, segment, and classify a region of interest, such as by using a thermal overlay to focus sensor resources on regions of interest and to reduce the ambiguity of objects of interest. Accordingly, based on thermal imaging input, heterogeneous sensors are targeted to regions of interest according to optimal sensor ranges.

In one implementation, a multimedia system receives sensor information from a plurality of sensors. A thermal imaging sensor locates a region of interest that includes an object of interest within predetermined infrared (IR) wavelengths. For example, the thermal imaging sensor may locate a region of interest including an object with a human thermal profile. Based on the data received from the thermal imaging sensor, data captured by other sensors is reduced for regions outside the region of interest. In one implementation, the field of view for the sensors may be expanded using a lower resolution or sensitivity of the sensors for regions outside the region of interest while increasing the resolution or sensitivity within the region of interest. Based on the thermal imaging sensor input, the multimedia system dynamically adjusts the regions upon which each of the sensors are focused and/or the parameters each sensor employs to capture data from a region of interest. Further, the thermal imaging sensor input may be used during data pre-processing to dynamically eliminate or reduce unnecessary data and to dynamically focus data processing on sensor input corresponding to a region of interest.

In another implementation, fused sensor input is used to locate and track users. A multimedia system receives depth information from a depth sensor corresponding to a depth image. The depth information is used to determine, with a low level of confidence, whether a human user is present in the depth image. Thermal information corresponding to a thermal image is received from a thermal imaging sensor. The thermal information is used to confirm that a human target is present (e.g., increasing the level of confidence and to filter out skeletons generated from the depth information that do not have a thermal profile that is compatible with a human thermal profile). The thermally-detected human target is scanned for body parts to generate a model of the human target so that the multimedia system can more accurately track the model.

In some implementations, articles of manufacture are provided as computer program products. One implementation of a computer program product provides a tangible computer program storage medium readable by a computing system and encoding a processor-executable program. Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
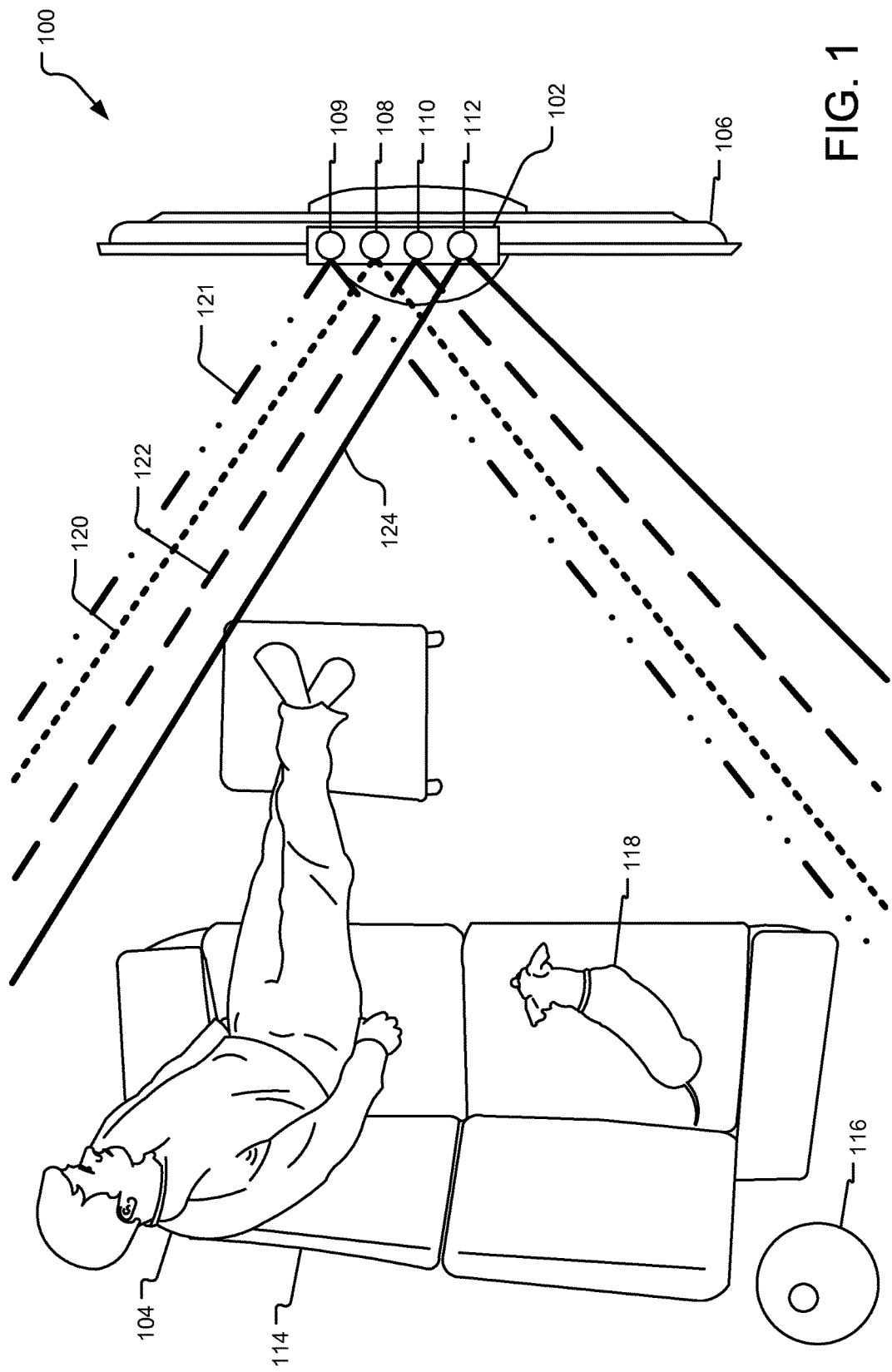
FIG. 1 illustrates an example multimedia environment including a capture device configured to perform input fusion using thermal imaging.

FIG. 1 illustrates an example multimedia environment 100 including a multimedia system 102 configured to perform input fusion using thermal imaging. The multimedia system 102 may be without limitation a gaming system, a home security system, a computer system, a set-top box, or any other device configured to capture input from heterogeneous sensors, including a thermal imaging sensor. Additionally, the multimedia system 102 may be used in a variety of applications including without limitation gaming applications, security applications, military applications, search and rescue applications, and remote medical diagnosis and treatment applications. A user 104 can interact with the multimedia system 102 by virtue of a user interface 106, which may include without limitation a graphical display, an audio system, and a target recognition, analysis and tracking system.

The multimedia system 102 is configured to capture and monitor light (whether visible or invisible), sounds, and other input reflected from regions within a field of view of a sensor communicatively connected to the multimedia system 102. The sensors may include without limitation a microphone, an RGB sensor, a depth sensor, a thermal sensor, a stereoscopic sensor, a scanned laser sensor, an ultrasound sensor, and a millimeter wave sensor. In one implementation, the multimedia system 102 projects a signal, such as visible light (e.g., RGB light), invisible light (e.g., IR light), acoustic waves, etc., into a field of view. The signal is reflected from the field of view and detected by one or more sensors in the multimedia system 102. Accordingly, the multimedia system 102 can capture a signal generated by the multimedia system 102 that can be used to locate and segment one or more regions of interest within the field of view, wherein each region of interest includes at least one object of interest (e.g., the user 104). However, the multimedia system 102 need not project a signal to capture data from a field of view. For example, in another implementation, the multimedia system 102 may utilize one or more passive sensors (e.g., a thermal sensor, an electrical sensor, etc.) to detect signals emitted or radiated from the field of view.

In one implementation, the multimedia system 102 includes an RGB sensor 108, a depth sensor 110, a thermal sensor 112, and an illumination source 109. As illustrated in FIG. 1, the RGB sensor 108 has an associated field of view 120 represented by dotted lines, the depth sensor 110 has an associated field of view 122 represented by dashed lines, the thermal sensor 112 has an associated field of view 124 represented by solid lines, and the illumination source 109 has an associated illumination field 121 represented by lines having a combination of dashes and dots. A field of view represents the extent of the region(s) from which data can be captured by a sensor at a particular instance of time. An illumination field represents the extent of the region(s) illuminated by a source at a particular instance in time. It should be understood that, although the RGB field of view 120, the depth field of view 122, the thermal field of view 124, and the illumination field 121 are depicted as overlapping, angular regions of a similar size, the positions and sizes of the fields of view 120, 122, and 124 and the illumination field 121 need not be interdependent. For example, the fields of view 120, 122, and 124 and the illumination field 121 may be angular, linear, areal, circular, and/or concentric and may be various sizes. Additionally, the fields of view 120, 122, and 124 and the illumination field 121 need not be the same size and need not be overlapping.

The RGB sensor 108 employs an additive color model, which acquires red, green, and blue color signals that may be combined to capture an image of the RGB field of view 120 with a broad array of colors. In one implementation, the RGB sensor 108 uses texture and pattern recognition (e.g., facial recognition) for object differentiation within the RGB field of view 120. Further, the RGB sensor 108 may be employed to determine a physical distance from the RGB sensor 108 to particular locations on an object of interest within the RGB field of view 120. It should be understood that multiple RGB sensors may be employed in some implementations, such as an implementation employing stereoscopic depth perception.

The depth sensor 110 is configured to capture signals or input with depth information. For example, a depth image of the depth field of view 122 having depth values may be captured via any suitable technique including, for example, time-of-flight, structured light, stereo image, etc. A depth sensor 110 may capture visible light (e.g., via one or more RGB or monochrome sensors) or invisible (e.g., via one or more IR sensors). An example depth image includes a two-dimensional (2-D) pixel area of the depth field of view 122, wherein each pixel in the 2-D pixel area may represent information indicating a distance from the sensor of an object of interest in the depth field of view 122. In one implementation, the multimedia system 102 organizes the depth information captured by the depth sensor 110 into "Z layers" or layers that are perpendicular to a Z-axis extending from the depth sensor 110 along its line of sight within the depth field of view 122. However, other implementations may be employed. The organized depth information may be used to locate an object of interest and generate a skeletal representation or model of the object of interest.

The thermal sensor 112 may be an active or passive infrared (IR) sensor operating at far IR light wavelengths. Any object that has a temperature above absolute zero emits energy in the form of IR light radiation, which represents a thermal profile of a particular object. The thermal sensor 112 measures IR light radiating from one or more objects within the thermal field of view 124. An object of interest may be identified, for example, when an object with a first thermal profile is located or passes in front of an object or region with a different thermal profile. The thermal sensor 112 is configured to capture signals or input with thermal information including a thermal image of the thermal field of view 124 having one or more thermal profiles. Generally, the thermal sensor 112 collects light in the 0.75 μm to 14 μm bandwidth. The thermal profiles of different regions or objects may be determined based on the number of photons collected by the thermal sensor 112 during a given time. Objects or regions with thermal profiles having higher temperatures emit more photons than objects or regions with thermal profiles having lower temperatures. The multimedia system 102 can distinguish objects by analyzing the thermal profiles of detected objects. For example, humans, such as the user 104, have a thermal profile within a limited temperature range. Many objects, such as a couch 114, a lamp 116, and a dog 118, have thermal profiles outside the temperature range associated with the human thermal profile. For example, the dog 118 has a thermal profile at temperatures that are higher than temperatures associated with the human thermal profile, and inanimate objects (e.g., the couch 114, a wall, a table, etc.) generally have thermal profiles at temperatures that are lower than the human thermal profile. As such, the multimedia system 102 may eliminate regions in the thermal field of view 124 outside the limited bandwidth associated with humans to filter out non-human objects. Further, the thermal information may be used to locate an object of interest and generate a skeletal representation or model of the object of interest.

However, in various contexts, including conditions outside the optimal ranges of the RGB sensor 108 and the depth sensor 110, captured data may be ambiguous or insufficient to effectively locate and segment objects of interest. For example, in conditions with intense ambient light, the RGB sensor 108 tends to saturate. Additionally, in low ambient light scenarios, the RGB sensor 108 may not effectively capture sufficient data from the RGB field of view 120 to locate and process dark regions of interest.

Further, the depth sensor 110 may capture depth information that is ambiguous and results in a false positive, identifying and tracking a human user when a human is not present in the field of view, or a false negative, failing to identify an existing human user in the field of view. For example, a false positive can occur where the RGB sensor 108 and/or the depth sensor 110 identifies various objects (e.g., the lamp 116, a poster, a mannequin, a teddy bear, a chair, etc.) or animals (e.g., the dog 118) as a human user and generates a skeletal model of the object/animal for tracking. A false negative can occur where the user 104 blends with surrounding objects, such as the couch 114. The RGB sensor 108 and the depth sensor 110 generally identify a human user by locating an object with the profile of an entire human body. As such, the RGB sensor 108 and the depth sensor 110 may fail to locate the user 104 if his torso sinks into the couch 114 or one or more body parts of the user 104 are obstructed from the RGB field of view 120 or the depth field of view 122.

Additionally, the thermal sensor 112 may locate human targets that are not objects of interest. For example, in the game system context, the thermal sensor 112 may falsely identify several human audience members that are not participating in a game as players. Accordingly, dynamic sensor input fusion using a thermal overlay may be used to target and distinguish regions or objects of interest according to optimal ranges of the RGB sensor 108, the depth sensor 110, and the thermal sensor 112. For example, a thermal overlay may be used to determine a region of interest in which a higher resolution of RGB sensing is employed to identify the face of one user as compared to the face of another user. In other implementations, a region of interest may be determined (at least in part) based on a depth map generated by the capture device, an electrical sensor, a microphone, and/or a fusion of sensors, whether resident on the capture device or external to the capture device (e.g., from another capture device).

In an example implementation, the thermal sensor 112 captures signals or input with thermal information including a thermal image of the thermal field of view 124 having one or more thermal profiles. For example, the thermal image of the thermal field of view 124 includes a thermal profile for the user 104, the couch 114, the lamp 116, and the dog 118. The multimedia system 102 processes the thermal information to perform a region of interest determination, which identifies a region with at least one object with appropriate energy within predetermined temperatures. For example, the multimedia system 102 may filter non-human objects with a thermal profile outside the human thermal profile, such as the couch 114, the lamp 116, and the dog 118, to focus the multimedia system 102 resources on an object of interest, such as the user 104.

The multimedia system 102 can receive sensor information from each of the RGB sensor 108, the depth sensor 110, and the thermal sensor 112. In one implementation, the multimedia system 102 processes the thermal information captured by the thermal sensor 112 to perform a region of interest determination to locate the user 104. Based on the thermal information, the multimedia system 102 reduces or eliminates data captured by the RGB sensor 108 and/or the depth sensor 110 that corresponds to regions outside the region of interest.

In another implementation, the thermal sensor 112 performs a region of interest determination to locate the user 104 before the multimedia system 102 receives sensor information from the RGB sensor 108 and the depth sensor 110. In this manner, the multimedia system 102 can direct the RGB sensor 108 and the depth sensor 110 to focus data capturing and processing on the region of interest. Using the thermal sensor 112 to direct the RGB sensor 108 and the depth sensor 110 regarding regions to process more (e.g., a region of interest) and regions to eliminate or reduce processing (e.g., in regions outside a region of interest), resulting in faster computation and reduced data processing requirements. In yet another implementation, the thermal sensor 112 performs a region of interest determination to locate the user 104, and in response to the determination, focuses the illumination generated by the illumination source 109 at the region of interest, rather than the entire field of view, thereby conserving power.

The multimedia system 102 improves the performance of the RGB sensor 108, the depth sensor 110, and the thermal sensor 112 by dynamically adjusting the parameters that each of the sensors 108, 110, and 112 employs based on the thermal information captured by the thermal sensor 112. For example, by focusing signal capturing and processing on the region of interest identified based on the thermal information, each of the sensors 108, 110, and 112 can increase resolution or sensitivity in the region of interest while expanding the fields of view 120, 122, and 124 at lower resolution or sensitivity outside the region of interest. Accordingly, if an object of interest, such as the user 104, is moving or a new object of interest enters one or more of the fields of view 120, 122, and 124, the multimedia system 102 can update the focus of the sensors 108, 110, and 112 without intensive computation.

Additionally, the multimedia system 102 may improve sensor performance by generating feedback to one or more of the sensors 108, 110, and 112 to ensure that each sensor is operating within its optimal range. For example, in high ambient noise conditions or in outdoor settings, the thermal information is used to focus the RGB sensor 108 and the depth sensor 110 such that the resolution or sensitivity of each sensor is increased in the region of interest to reduce any negative effects of the ambient light. The feedback may additionally be used to reduce data input from a sensor operating outside its optimal range and increase data input from another sensor. For example, in low ambient light conditions, the multimedia system 102 may reduce input from the RGB sensor 108 and increase input from the depth sensor 110 and the thermal sensor 112, and/or increase output from the illumination source 109. Further, the fused input from the sensors 108, 110, and 112 may be used to control light exposure to focus on an object of interest. For example, the thermal sensor 112 can locate active light sources (e.g., the lamp 116) by determining that the light source is within a thermal profile of an active light source (e.g., a light bulb in the lamp 116 is on). The active light sources may be excluded from data processing, such as an RGB histogram generation, to control gain and exposure values to focus on objects of interest.

In another implementation, the multimedia system 102 uses thermal imaging to locate an object of interest, for example the user 104, which may be visually tracked. The multimedia system 102 receives depth information captured by the depth sensor 110 or RGB sensor 108 corresponding to a depth image. The depth information is used to determine, with a low level of confidence, whether a human user is present in the depth image. The multimedia system 102 further receives thermal information corresponding to a thermal image captured by the thermal imaging sensor 112. The thermal information is used to confirm that a human user is present and to filter out objects that do not have a thermal profile that is compatible with a human thermal profile. For example, the couch 114, the lamp 116, and the dog 118 are filtered out. Accordingly, false positives and false negatives are significantly reduced. Further, the RGB sensor 108 and/or the depth sensor 110 may be used to distinguish between non-participating human audience members and a human user, such as a player of a game. The data captured by the RGB sensor 108 and the depth sensor 110 may be processed to filter humans based on the level of movement. For example, non-participating human audience members will generally be moving less than a human user.

The thermal sensor 112, the depth sensor 110, and/or the RGB sensor 108 scan the user 104 for body parts to generate a model of the user 104 including but not limited to a skeletal model, a mesh human model, or any other suitable representation of the user 104. In one implementation, the resolution of the thermal sensor 112 is increased to distinguish between different body parts of the user 104 and reduce ambiguity resulting from the user 104 wearing baggy clothes, a body part of the user 104 being obstructed, or the user 104 distorting one or more body parts (e.g., the torso of the user 104 sinking into the couch 114). Accordingly, input fusion based on thermal information results in a model with higher accuracy, even in contexts where part of the body profile of the user 104 is obstructed or distorted.

The model of the user 104 may be tracked such that physical movements or motions of the user 104 (e.g., gestures) may act as part of a real-time, bi-directional user interface that adjusts and/or controls parameters of an application on the multimedia system 102. For example, the user interface 106 may display a character, avatar, or object associated with an application. The tracked motions of the user 104 may be used to control or move the character, avatar, or object or to perform any other suitable controls of the application.

In one implementation, the user 104 may be moving or performing an activity, such as exercising. While tracking the model of the user 104, the multimedia system 102 can use thermal information to monitor a level of exertion of the user 104 and dynamically update an activity level of the user 104 based on the level of exertion. For example, if the multimedia system 102 determines that the level of exertion of the user 104 is too high based on an increasing temperature of the user 104, the multimedia system 102 may suggest a break or lower the activity level. Additionally, the multimedia system 102 may determine a target level of exertion and depict the current level of exertion of the user 104 on the user interface 106 as the user 104 works towards the target level of exertion.

In another implementation, the region of interest is determined based on a depth map generated from depth information captured by a depth sensor. For example, in one implementation, the illumination source 109 projects structured light onto the scene, and a depth sensor 110 captures the reflected light to generate depth information indicating the distance between the depth sensor 110 and individual points in the scene. In some applications, the system may assume that a relevant object (e.g., the human user 104) is represented by points in the scene that are within a certain range of distances between the depth sensor 110 and the object. This discernment can be enhanced when supplemented with a thermal overlay or other information. Based on classification of these points as a region of interest based on the depth map, the multimedia system 102 can adjust its resource consumption accordingly. For example, the multimedia system 102 can reduce the resolution of points within the field of view but outside the region of interest, thereby reducing the information sent by a capture device to a console. Likewise, the capture device can simply omit depth and RBG information for points outside the region of interest but within the field of view raw data processed by the capture device and/or from the processed data sent back to the console. In another scenario, the illumination field 121 can be focused on the region of interest to use less power. (Generally, illumination of the same intensity within a narrower field of view consumes less power.)

In yet another implementation, the region of interest is determined based on information received from an electrical sensor that detects the subtle electrical signal that emanates from live objects, such as human users. A map (e.g., an electrical overlay) between such electrical regions and the points in the scene can represent a region of interest in much the same manner as a thermal overlay.

Figure 2:
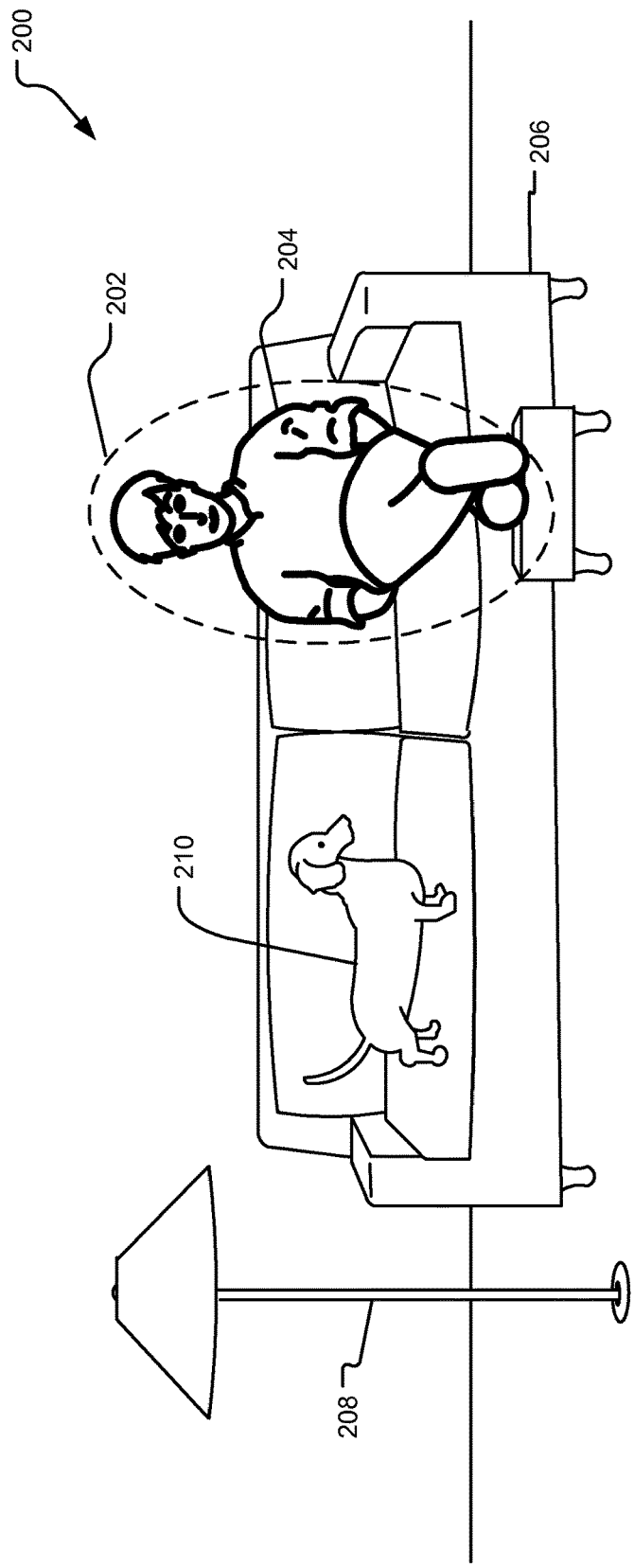
FIG. 2 illustrates an example multimedia environment using thermal imaging to locate a region of interest.

FIG. 2 illustrates an example multimedia environment 200 using thermal imaging to locate a region of interest 202. The region of interest 202 is represented by a dashed line in FIG. 2 and includes an object of interest, which includes a user 204. The region of interest 202 is located and the user 204 is segmented using dynamic fusion input based on thermal information.

In an example implementation, a thermal sensor (not shown) captures signals or input with thermal information including a thermal image having one or more thermal profiles. For example, the thermal image includes a thermal profile for the user 204, a couch 206, a lamp 208, and a dog 210. The thermal information is processed to perform a region of interest determination to identify the region of interest 202. The region of interest 202 is identified as including at least one object with an appropriate energy within predetermined temperatures. For example, the region of interest 202 includes the user 204, which includes energy within predetermined temperature range corresponding to a human thermal profile. Regions outside the region of interest 202 may be filtered to eliminate non-human objects with a thermal profile outside the human thermal profile, such as the couch 206, the lamp 208, and the dog 210. Filtering the regions outside the region of interest 202 reduces data input to focus sensor resources on an object of interest, such as the user 204. In this manner, the region of interest 202 can be used as a mask to enhance performance in the region of interest 202 in exchange for diminished performance outside the region of interest 202.

In one implementation, after the region of interest determination is performed based on the thermal information, other sensors, including without limitation one or more of the following: a microphone, an RGB sensor, a depth sensor, a thermal sensor, a stereoscopic sensor, a scanned laser sensor, an ultrasound sensor, and a millimeter wave sensor, are focused on capturing and processing data corresponding to the region of interest 202. Further, the performance of other sensors may be improved based on the thermal information by dynamically adjusting the parameters that each of the other sensors employ. For example, by focusing signal capturing and processing on the region of interest 202, other sensors can increase resolution or sensitivity in the region of interest 202 while expanding the fields of view associated with each sensor. Accordingly, if the user 204 is moving or a new object of interest enters a field of view associated with a sensor, the focus of the sensors may be updated without intensive computation. Additionally, sensor performance may be improved by generating feedback, based on the thermal information, to one or more of the sensors to ensure that each sensor is operating within its optimal range. The feedback may be further used to reduce data input from a sensor operating outside its optimal range and increase data input from another sensor.

In another implementation, thermal imaging is used to segment and track the user 204. A depth sensor or an RGB sensor captures depth information corresponding to a depth image. The depth information is used to determine, with a low level of confidence, whether a human user is present in the depth image. The thermal information is used to confirm that a human user is present and to filter out objects that do not have a thermal profile that is compatible with a human thermal profile. For example, the couch 206, the lamp 208, and the dog 210 are filtered out. Accordingly, false positives and false negatives are significantly reduced. For example, the user 204 is located within the region of interest 202, and data corresponding to regions outside the region of interest 202 is filtered out. Further, the thermal information is used to segment the user 204 within the region of interest 202 and distinguish the user 204 from the couch 206. The segmentation of the user 204 is illustrated in FIG. 2, for example, by the darkened lines.

The user 204 is scanned by one or more sensors for body parts to generate a model of the user 204 including but not limited to a skeletal model, a mesh human model, or any other suitable representation of the user 204. In one implementation, the thermal information or other sensor input may be used to distinguish between different body parts of the user 204 and reduce ambiguity resulting from the user 204 wearing baggy clothes, a body part of the user 204 being obstructed, or the user 204 distorting one or more body parts (e.g., the torso of the user 204 sinking into the couch 206). Accordingly, input fusion based on thermal information results in a model of the user 204 with higher accuracy, even in contexts where part of the body profile of the user 204 is obstructed or distorted.

As previously discussed, a depth map or an electrical overlay can be used to determine a region of interest in a similar manner as a thermal overlay. Further, such mappings can be used in combination to enhance the determination of a region of interest (e.g., a thermal overlay can reduce ambiguities in a purely depth-based mapping).

Figure 3:
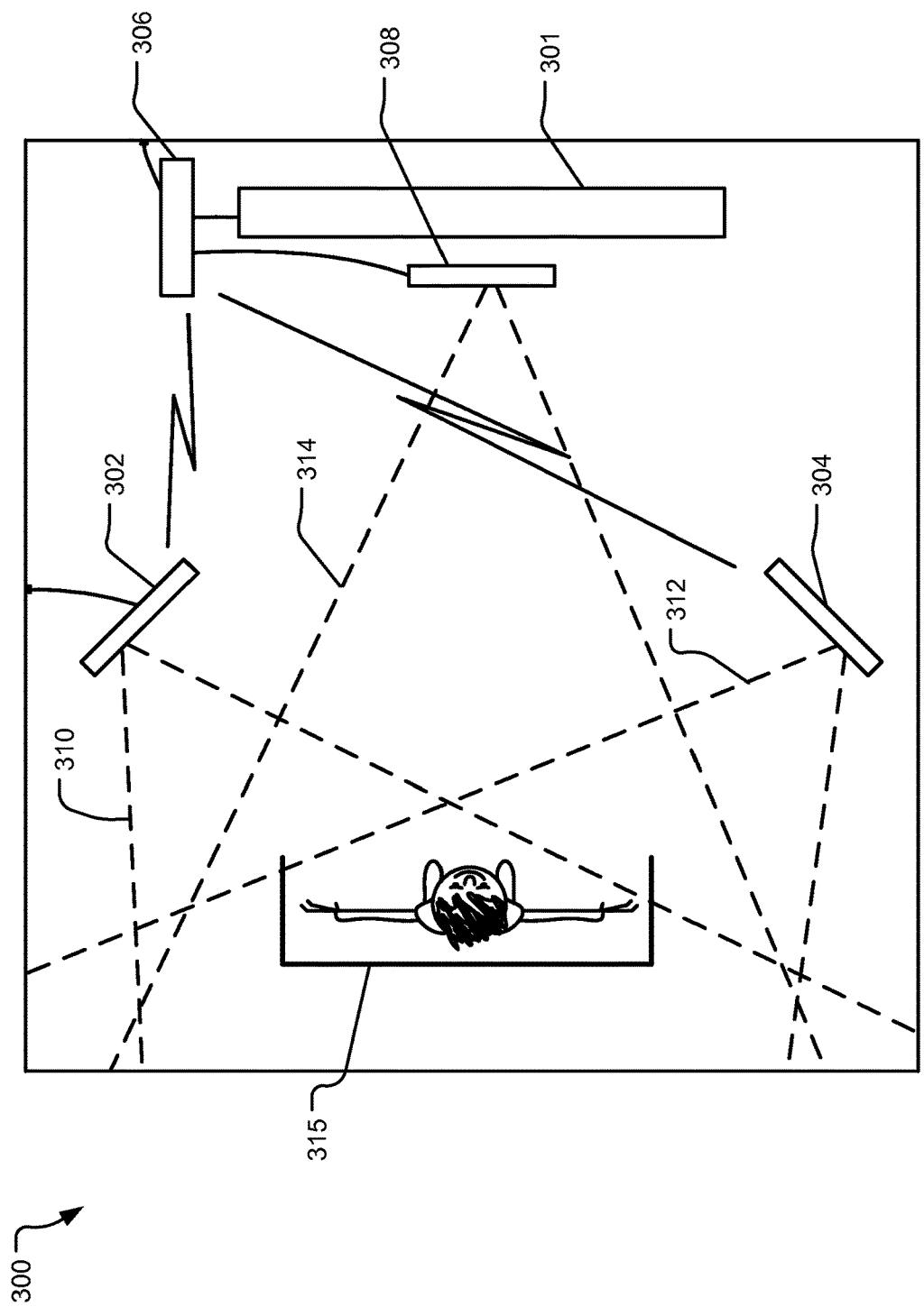
FIG. 3 illustrates an example multimedia environment using multiple wireless capture devices.

FIG. 3 illustrates an example multimedia environment 300 using multiple wireless capture devices 302 and 304. The wireless capture device 302 communicates wirelessly with a console 306 (which is sitting beside a display 301) but is powered by an external power supply from a wall socket, and the wireless capture device 304 communicates wirelessly with the console 306 but is powered internally. The illustrated multimedia environment 300 is also shown with a wired capture device 308, which is tethered by a wired connection to the console 306 and is powered by an external power supply from a wall socket. Each capture device 302, 304, and 308 has a corresponding field of view 310, 312, and 314, respectively.

One of many possible region of interest determination techniques may be employed to define region of interest 315 as a subset of the one or more of the fields of view 310, 312, and 314, including use of a thermal overlay, an electrical overlay, or a depth map. Based on the determined region of interest 315, one or more of the capture devices 302, 304, and 308 can narrow their fields of view, narrow their illumination fields, reduce data communication needs, and/or reduce power consumption, although there is less motivation for the wired capture device 308 to do so. One consideration in certain applications is the latency between the actual capture of scene data (e.g., RBG data, audio data, depth information, etc.) and its receipt and processing by the console 306. Reducing this latency can greatly improve the multimedia experience in many applications. Furthermore, reducing the computational requirements of a capture device can reduce the cost of the device and the power it consumes. Accordingly, balancing the computational load on the capture device in compressing data with the bandwidth needs between the capture device and the console can provide significant benefits. Further, determining the region of interest 315 and then adjusting the operational parameters of the capture device, and particularly its sensors and/or illumination source, based on the region of interest 315 is one method of balancing these factors.

Turning to the wireless but wall-powered capture device 302, a relevant concern is the limited wireless bandwidth through which to communicate captured data to the console 306. In one implementation, various data compression techniques, including inter frame and intra frame compression may be used to reduce the volume of information sent by the capture device 302 to the console 306. Alternative or additional compression techniques may be employed.

One method of reducing the amount of data communicated to the console 306 is to use the region of interest 315 as a mask on the field of view 310. In one implementation, the region of interest mask focuses data processing of the capture device 302 on captured data corresponding to the region of interest 315. For example, the capture device 302 may omit or reduce raw data for points outside the region of interest 315 but within the field of view 310 raw data. Alternatively or additionally, the capture device 302 may omit or reduce processed data for points outside the region of interest 315 but within the field of view 310 data processed by the capture device 302. The reduction in raw or processed data reduces the volume of raw and processed data sent by the capture device 302 to the console 306. Further, substantially processing the raw data in the capture device 302 before transmitting information to the console 306 reduces data communication needs.

In another implementation, the operational parameters of one or more sensors and/or an illumination source in the capture device 302 are adjusted based on the region of interest 315. For example, the resolution/sensitivity of a sensor or the intensity of the illumination source in the capture device 302 may be set to a higher resolution/sensitivity/intensity within the region of interest 315 as compared to points outside the region of interest 315 but within the field of view 310. Reducing the resolution of points within the field of view 310 but outside the region of interest 315 reduces the amount of captured and processed data, which reduces the information sent by the capture device 302 to the console 306.

In yet another implementation, the field of view 310 and/or illumination field of the capture device 302 may be narrowed or expanded according to the location (e.g., lateral and vertical location and/or distance from the sensor) and/or size of the region of interest 315. For example, the field of view 310 may be narrowed to focus raw data capture on the region of interest 315. Focusing raw data capture on the region of interest 315 reduces the volume of processed data, thereby limiting the amount of information sent to the console 306.

Turning to the wireless but internally powered capture device 304, a relevant concern in addition to the limited wireless bandwidth through which to communicate captured data to the console 306 is the limited power available for capturing and processing data. Similar to the implementations described above with respect to the capture device 302, the capture device 304 reduces the volume of data communicated to the console 306, for example, by narrowing the field of view 312, reducing data communication needs, adjusting the operational parameters of one or more sensors and an illumination source, and/or applying a region of interest mask. Reducing or compressing captured raw data reduces computational requirements, thereby conserving power. Further, adjusting the operational parameters of a sensor or the illumination source based on a detected region of interest focuses and conserves the power of the capture device 304.

In one implementation, the illumination field of the capture device 304 is focused on the region of interest 315 to conserve power. Generally, an illumination source consumes a substantial amount of the power of a capture device. Accordingly, keeping the intensity of the illumination source constant while narrowing the illumination field to the region of interest 315 significantly reduces power consumption of the capture device 304.

In another implementation, the operational parameters of one or more sensors and/or an illumination source in the capture device 304 are adjusted based on the region of interest 315 to conserve power. The field of view of a capture device and the resolution/sensitivity of a sensor impact the level of illumination intensity needed. As such, because an illumination source generally consumes a substantial amount of the power of a capture device, adjusting the operational parameters of one or more sensors in the capture device 304 may reduce power consumption of the capture device 304. For example, the resolution/sensitivity of a sensor in the capture device 304 may be set to a higher resolution/sensitivity within the region of interest 315 as compared to points outside the region of interest 315 but within the field of view 312. Increasing the resolution/sensitivity of a sensor in the capture device may reduce the level of illumination intensity necessary to capture the field of interest 315, and reducing the illumination intensity would proportionally reduce the power consumption of the capture device 304.

Another method of reducing the amount of data communicated from a capture device to the console 306 and/or the power consumed by a capture device is to use a detected region of interest to allocate the data capturing, processing, and communicating between the capture devices 302, 304, and 308. Each of the capture devices 302, 304, and 308 capture data from the region of interest 315. However, based on the position of the region of interest 315, each of the capture devices 302, 304, and 308 has a different perspective of the region of interest 315. Accordingly, each of the capture devices 302, 304, and 308 may capture different details of points in the region of interest 315 based on the different perspectives. By allocating the data capturing, processing, and communicating between the capture devices 302, 304, and 308, the power consumption of and data communicated from each of the capture devices 302, 304, and 306 is reduced. For example, one or more of the capture devices 302, 304, and 308 may omit or reduce data corresponding to points in a field of view that are allocated to another capture device. In one implementation, the capture devices 302, 304, and 308 are self-locating and communicate with each other and the console 306 to allocate resources. In another implementation, the capture devices 302, 304, and 308 are manually located.

The console 306 may employ various parameters for allocating the data capturing, processing, and communicating between the capture devices 302, 304, and 308. In one implementation, the allocation is based on a relative distance to points within the region of interest 315. For example, each capture device 302, 304, and 308 may capture, process, and communicate data corresponding to points within a region of interest that are nearest to the respective capture device. In another implementation, the allocation is based on the resources available in each capture device 302, 304, and 308. For example, if one capture device is low on power, the remaining capture devices may be allocated more data capturing, processing, and communicating tasks. Further, if one or more of the sensors of a capture device is receiving data outside its operational range, the remaining capture devices may be allocated more data capturing, processing, and communicating tasks. In yet another implementation, the allocation is based on relative detail of points within the region of interest 315 captured by a capture device. For example, if the perspective of a capture device results in the capturing device acquiring more detail of points within the region of interest 315, that capture device may be allocated more capturing, processing, and communicating tasks for data corresponding to those points.

Figure 4:
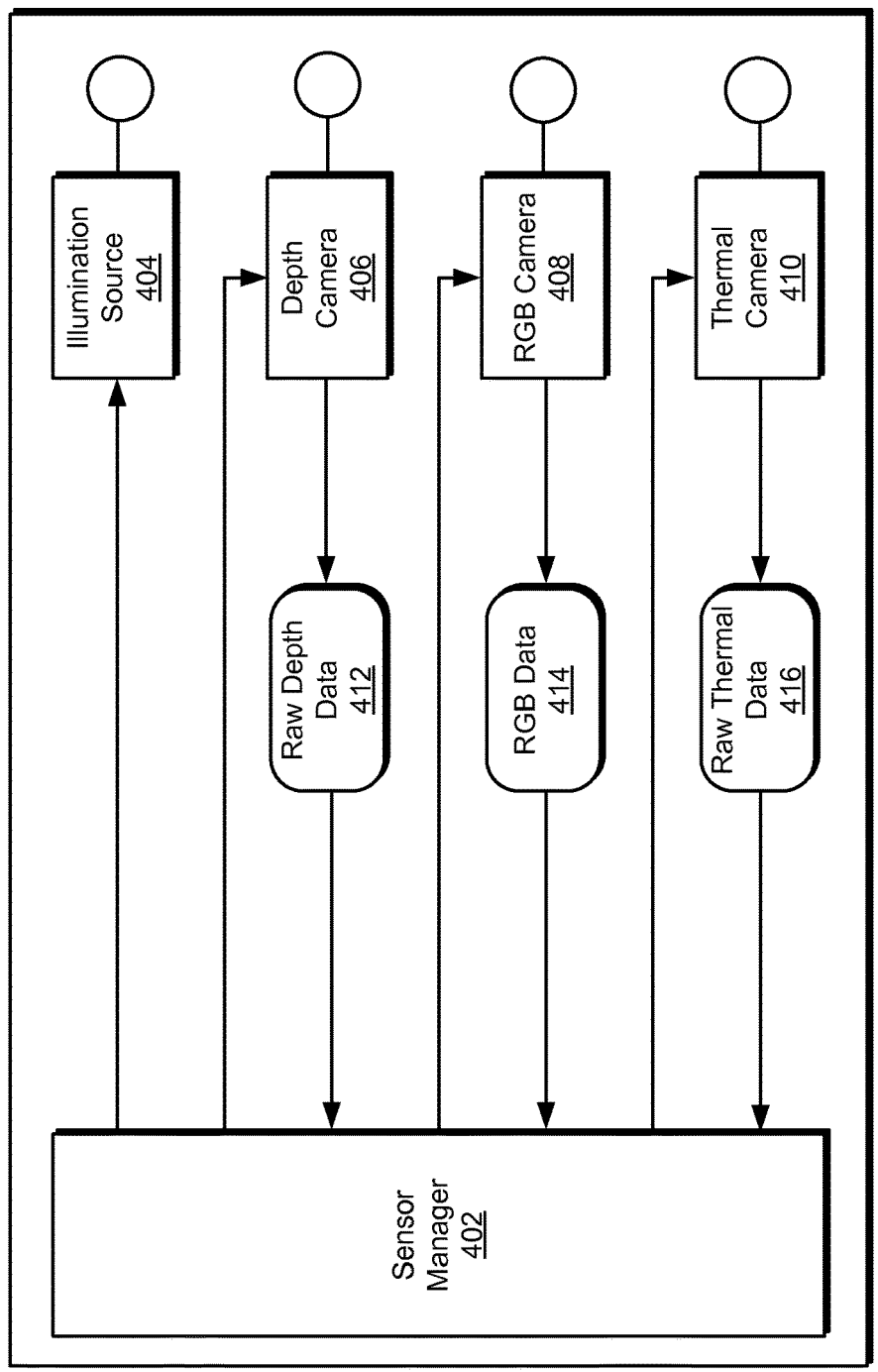
FIG. 4 illustrates an example capture device including a sensor manager.

FIG. 4 illustrates an example capture device 400 including a sensor manager 402. The sensor manager 402 controls the parameters and focus of one or more sensors and an illumination source 404. In the illustrated implementation, the one or more sensors include a depth camera 406, an RGB camera 408, and a thermal camera 410.

The depth camera 406 is configured to capture signals or input with depth information including a depth image having depth values, which may be captured via any suitable technique including, for example, time-of-flight, structured light, stereo image, etc. An example depth image includes a two-dimensional (2-D) pixel area of the depth image wherein each pixel in the 2-D pixel area may represent a distance of an object of interest in the depth image. The depth camera 406 outputs raw depth data 412, which includes the depth information. In one implementation, the raw depth data is processed to organize the depth information into "Z layers" or layers that are perpendicular to a Z-axis extending from the depth camera 406 along its line of sight. However, other implementations may be employed. The organized depth information may be used to locate an object of interest and generate a skeletal representation or model of the object of interest.

The RGB camera 408 is configured to acquire red, green, and blue color signals, which the RGB camera 408 output as RGB data 414. The sensor manager 402 or another component, such as a multimedia system, may combine the signals in the RGB data 414 to capture an image with a broad array of colors. In one implementation, the RGB data 414 is used for texture and pattern recognition (e.g., facial recognition) for object differentiation. Further, the RGB data 414 may be employed to determine a physical distance from the RGB camera 408 to particular locations on an object of interest.

The thermal camera 410 may be a passive infrared (IR) sensor operating at far IR light wavelengths. Any object that has a temperature above absolute zero emits energy in the form of IR light radiation, which represents a thermal profile of a particular object. Generally, the thermal camera 410 collects light in the 0.75 µm to 14 µm bandwidth. The thermal profiles of different regions or objects may be determined based on the number of photons collected by the thermal camera 410 during a given time. Objects or regions with thermal profiles having higher temperatures emit more photons than objects or regions with thermal profiles having lower temperatures. In one implementation, the thermal camera 410 measures temperature from one or more objects via a thermal sensor component or an array of thermal sensor components, which is made from a material that has a thermal inertia associated with it. The thermal sensor component has a resistance that changes depending on the photons captured by the thermal camera 410. The thermal sensor component may be made from materials including without limitation natural or artificial pyroelectric materials. False indications of thermal change (e.g., when the thermal camera 410 is exposed to a flash of light or field-wide illumination) are eliminated as a result of the self-cancelling characteristics of the sensor components. For example, a change in IR energy across the entire array of the sensor components associated, which corresponds to a false indication of thermal change, is self-cancelling.

The thermal camera 410 is configured to capture signals or input with thermal information including a thermal image having one or more thermal profiles. The thermal camera 410 outputs raw thermal data 416, which includes the thermal information. The raw thermal data 416 may be processed to distinguish objects by analyzing the thermal profiles of detected objects. Based on the raw thermal data 416, the sensor manager 402 may eliminate the raw depth data 412 and the RGB data 414 corresponding to regions with objects that have a thermal profile outside the temperature range associated with an object of interest to focus data processing.

In one implementation, the sensor manager 402 receives the raw depth data 412, the RGB data 414, and the raw thermal data 416. The sensor manager processes the raw thermal data 416 to perform a region of interest determination. Based on the raw thermal data 416, the sensor manager 402 reduces or eliminates data captured by the RGB camera 408 and/or the depth camera 406 that corresponds to regions outside the region of interest. In another implementation, the sensor manager 402 receives the raw thermal data 416 and performs a region of interest determination. The sensor manager 402 generates feedback to the depth camera 406 and the RGB camera 408 to focus data capturing and processing on the region of interest. As a result, the capture device 400 performs computation faster and requires less data elimination.

In one implementation, the sensor manager 402 improves the performance of the depth camera 406, the RGB camera 408, and the thermal camera 410 by dynamically adjusting the parameters that each of the cameras 406, 408, and 410 employs based on the raw thermal data 416. For example, by focusing signal capturing and processing on a region of interest identified based on the raw thermal data 416, each of the cameras 306, 408, and 410 can increase resolution or sensitivity in the region of interest while expanding the respective fields of view.

Additionally, the sensor manager 402 may improve sensor performance by generating feedback to one or more of the cameras 306, 408, and 410 to ensure that each camera is operating within its optimal range. For example, in intense ambient noise conditions or in outdoor settings, sensor manager 402 uses the raw thermal data 416 to focus the RGB camera 408 and the depth camera 406 such that the resolution or sensitivity of each camera is increased in the region of interest to reduce any negative effects of the intense ambient light. The sensor manager 402 may additionally generate feedback to reduce data input from a camera operating outside its optimal range and increase data input from another camera. For example, in low ambient light conditions, the sensor manager 402 may reduce input from the RGB camera 408 and increase input from the depth camera 406 and the thermal camera 410. Further, the sensor manager 402 may use the fused input of the raw depth data 412, the RGB data 414, and the raw thermal data 416 to generate feedback to the illumination source 404 to update the parameters and exposure settings of the illumination source 404. Accordingly, the sensor manager 402 controls light exposure to focus on an object of interest based on the fused input of the depth camera 406, the RGB camera 408 and the thermal camera 410.

Figure 5:
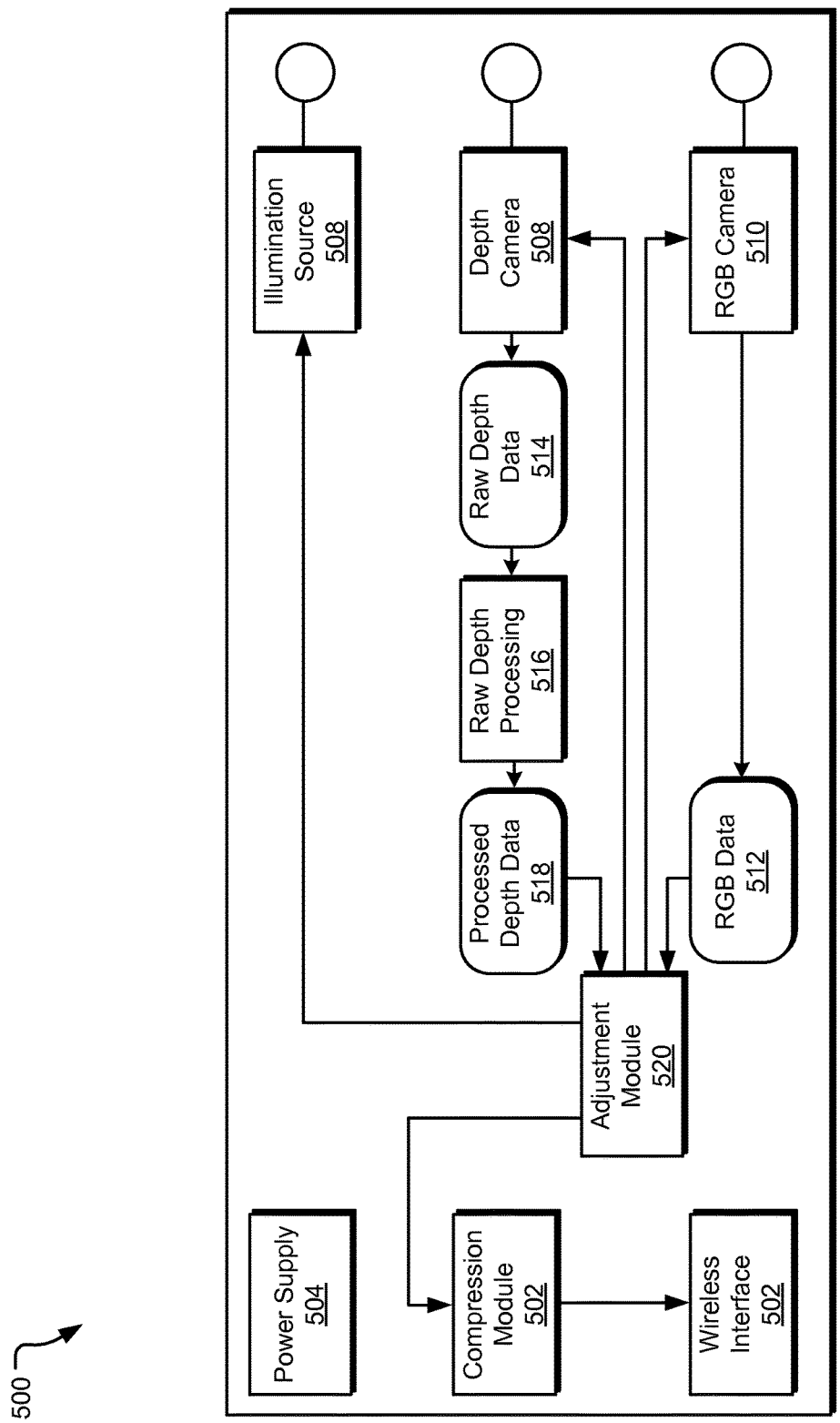
FIG. 5 illustrates an example architecture of a resource-conserving capture device.

FIG. 5 illustrates an example architecture of a resource-conserving capture device 500. The capture device 500 includes a wireless interface 502 and a power supply 504. In one implementation, the capture device 500 communicates wirelessly with a computing system, such as a console. The capture device 500 may further communicate with one or more other capture devices via the wireless interface 502. The capture devices, including the capture device 500, may be self-locating or manually located so that a capture device understands their locations with respect to other capture devices. The power supply 504 may connect to an external power supply or be an internal power supply. In one implementation, the power supply 504 obtains power from an external power supply from a wall socket. In another implementation, the power supply 504 is a battery. However, other powering techniques including but not limited to solar power are contemplated.

The capture device 500 has a field of view based on one or more sensors. In the illustrated implementation, the one or more sensors include a depth camera 508 and an RGB camera 510. However, the capture device 500 may include additional sensors, including but not limited to a thermal sensor, an electrical sensor, a stereoscopic sensor, a scanned laser sensor, an ultrasound sensor, and a millimeter wave sensor. The capture device 500 additionally has an illumination field emitted from an illumination source 506.

The depth camera 508 and the RGB camera 510 may be used to detect a region of interest as a subset of the field of view of the capture device 500. One of many possible region of interest techniques may be employed to define the region of interest. For example, an RGB image or a depth map acquired from the data captured by the RGB camera 510 or the depth camera 508, respectively, may be used to define the region of interest. However, other techniques including but not limited to use of a thermal overlay and/or an electrical overlay may be employed. Relevant concerns for a wireless, internally powered captured device are the limited wireless bandwidth through which to communicate captured data and the limited power available to the capture device to capture and process data. However, based on the region of interest, the operational parameters of the capture device 500 are adjusted to conserve resources. For example, based on the region of interest, a raw depth processing module 516, an adjustment module 520, and/or a compression module 522 may adjust the operational parameters of the illumination source 506, the depth camera 508, and/or the RGB camera 510, reduce data communication needs, and/or reduce power consumption.

In the illustrated implementation, the depth camera 508 captures signals or input with depth information including a depth image having depth values, which may be captured via any suitable technique including, for example, time-of-flight, structured light, stereo image, etc. The depth camera 508 outputs raw depth data 514, which includes the depth information. The raw depth data 514 is input into a raw depth processing module 516. In one implementation, the raw depth data 514 is processed to organize depth information based on the detected region of interest. Processing the raw depth data 514 in the capture device 500 as opposed to transmitted the raw depth data 514 to be processed by another computing system reduces data communication needs, thereby reducing the volume of data communicated via the wireless interface 502. In another implementation, the raw depth processing module 516 may omit or reduce the raw depth data 514 for points outside the region of interest but within the field of view of the depth camera 508. The reduction in the raw data 514 reduces computational needs and communication needs, which reduces resource consumption. In yet another implementation, the raw depth processing module 516 generates feedback to one or more of the illumination source 506, the depth camera 508, and the RGB camera 510 to adjust the operational parameters of the capture device 500. The raw depth processing module 516 outputs processed depth data 518. In one implementation, the processed depth data 518 includes depth information corresponding to the region of interest.

The RGB camera 510 captures red, green, and blue color signals, which are output as RGB data 512. The RGB data 512 and the processed depth data 518 are input into the adjustment module 520, which uses the region of interest as a mask on the processed depth data 518 and the RGB data 512. Accordingly, the adjustment module 520 conserves resources by reducing the volume of data communicated via the wireless interface 502 and the power consumed from the power supply 504. In one implementation, the masking operation is performed by the raw depth processing module 516 instead of or in addition to the adjustment module 520.

In one implementation, the adjustment module 520 omits or reduces the processed depth data 518 and/or the RGB data 512 for points outside the region of interest but within the field of view of the depth camera 508 and/or the RGB camera 510.

In another implementation, the adjustment module 520 generates feedback to one or more of the illumination source 506, the depth camera 508, and the RGB camera 510 to adjust the operational parameters based on the region of interest. For example, the resolution/sensitivity of the depth camera 508 and/or the RGB camera 510 may be set to a higher resolution/sensitivity within the region of interest as compared to points outside the region of interest but within the field of view. Reducing the resolution of points within the field of view but outside the region of interest reduces the volume of captured and processed data, which reduces the information sent via the wireless interface 502 and reduces the power consumed from the power supply 504 for computation. Additionally, the illumination field of the illumination source 506 is focused on the region of interest to conserve power. Generally, an illumination source consumes a substantial amount of the power of a capture device. Accordingly, keeping the intensity of the illumination source 506 constant while narrowing the illumination field to the region of interest significantly reduces power consumption from the power supply 504. Further, if the resolution/sensitivity of the depth camera 508 and/or the RGB camera 510 is set higher within the region of interest as compared to points outside the region of interest but within the field of view, the illumination source 506 may proportionally reduce the level of illumination intensity, which would proportionally reduce the power consumption from the power supply 504.

In yet another implementation, the field of view of the depth camera 508, the RGB camera 510, and/or illumination field of the illumination 506 may be narrowed or expanded according to the location (e.g., lateral and vertical location and/or distance from the sensor) and/or size of the region of interest. For example, the field of view of the depth camera 508 may be narrowed to focus raw data capture on the region of interest. Focusing raw data capture on the region of interest reduces the volume of processed data, thereby limiting the amount of information sent via the wireless interface 502 and the power consumed from the power supply 504.

The adjustment module 520 outputs data into the compression module 522, which employs various compression techniques, including inter frame and inter frame compression, to reduce the volume of data sent via the wireless interface 502.

Figure 6:
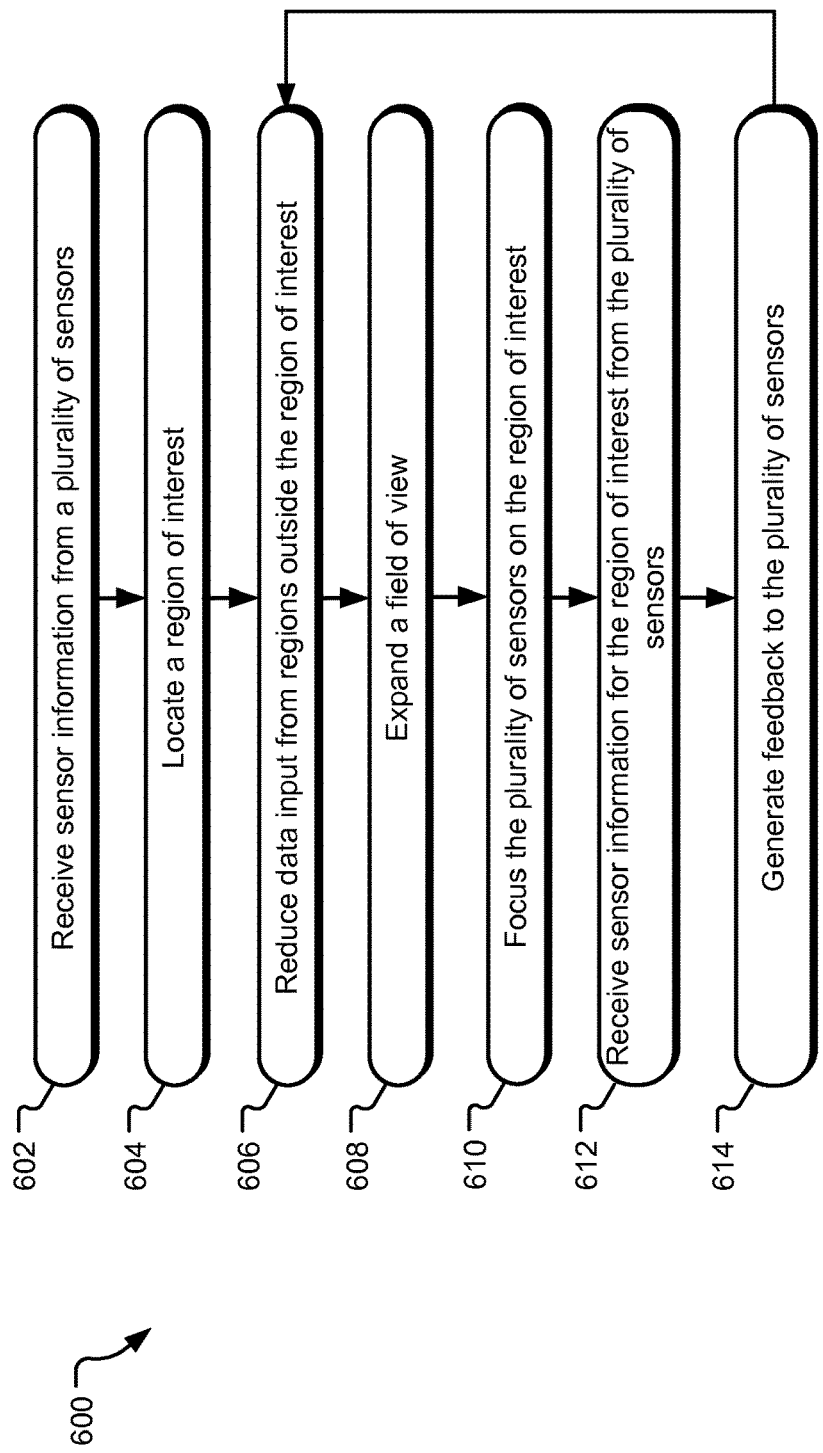
FIG. 6 illustrates example operations for dynamically segmenting a region of interest according to optimal sensor ranges using thermal overlay.

FIG. 6 illustrates example operations 600 for dynamically segmenting a region of interest according to optimal sensor ranges using thermal overlay. In one implementation, the operations 600 are executed by software. However, other implementations are contemplated.

During a receiving operation 602, a multimedia system receives sensor information from a plurality of sensors, which may include without limitation a microphone, an RGB sensor, a depth sensor, a thermal sensor, a stereoscopic sensor, a scanned laser sensor, an ultrasound sensor, and a millimeter wave sensor.

A locating operation 604 locates a region of interest, which includes at least one object of interest, such as a human user. A thermal imaging sensor locates the region of interest by identifying an object with a thermal profile that is within predetermined temperatures. For example, the thermal imaging sensor may locate a region of interest including an object with a human thermal profile. In one implementation, the locating operation 604 is performed before the receiving operation 602.

Based on the data received from the thermal imaging sensor, a reducing operation 606 reduces data captured by other sensors for regions outside the region of interest in. For example, regions outside the region of interest may be filtered to eliminate non-human objects with a thermal profile outside the human thermal profile. Filtering the regions outside the region of interest reduces data input to focus sensor resources on an object of interest. An expanding operation 608 expands the field of view for the plurality of sensors using a lower resolution or sensitivity for regions outside the region of interest while increasing the resolution or sensitivity for the region of interest.

Based on the thermal imaging sensor input, a focusing operation 610 dynamically adjusts the regions each of the plurality of sensors are focused on and the parameters each sensor employs to capture data from a region of interest. Further, the thermal imaging sensor input may be used during data pre-processing in the focusing operation 610 to dynamically eliminate or reduce unnecessary data and to dynamically focus data processing on sensor input corresponding to a region of interest.

In a receiving operation 612, the multimedia system receives sensor information for the region of interest from the plurality of sensors. Based on the sensor information received during the receiving operation 612, a generating operation 614 generates feedback to the plurality of sensors to improve the performance of the sensors. The generating operation 614 dynamically updates and improves the sensors, for example, by iterating back to the reducing operation 606. In one implementation, the performance of sensors may be improved based on the thermal information by dynamically adjusting the parameters that each of the other sensors employ. For example, by focusing signal capturing and processing on the region of interest, one or more sensors can increase resolution or sensitivity in the region of interest while expanding the fields of view associated with each sensor. Additionally, the generating operation 614 may ensure that each sensor is operating within its optimal range or may reduce data input from a sensor operating outside its optimal range and increase data input from another sensor.

Figure 7:
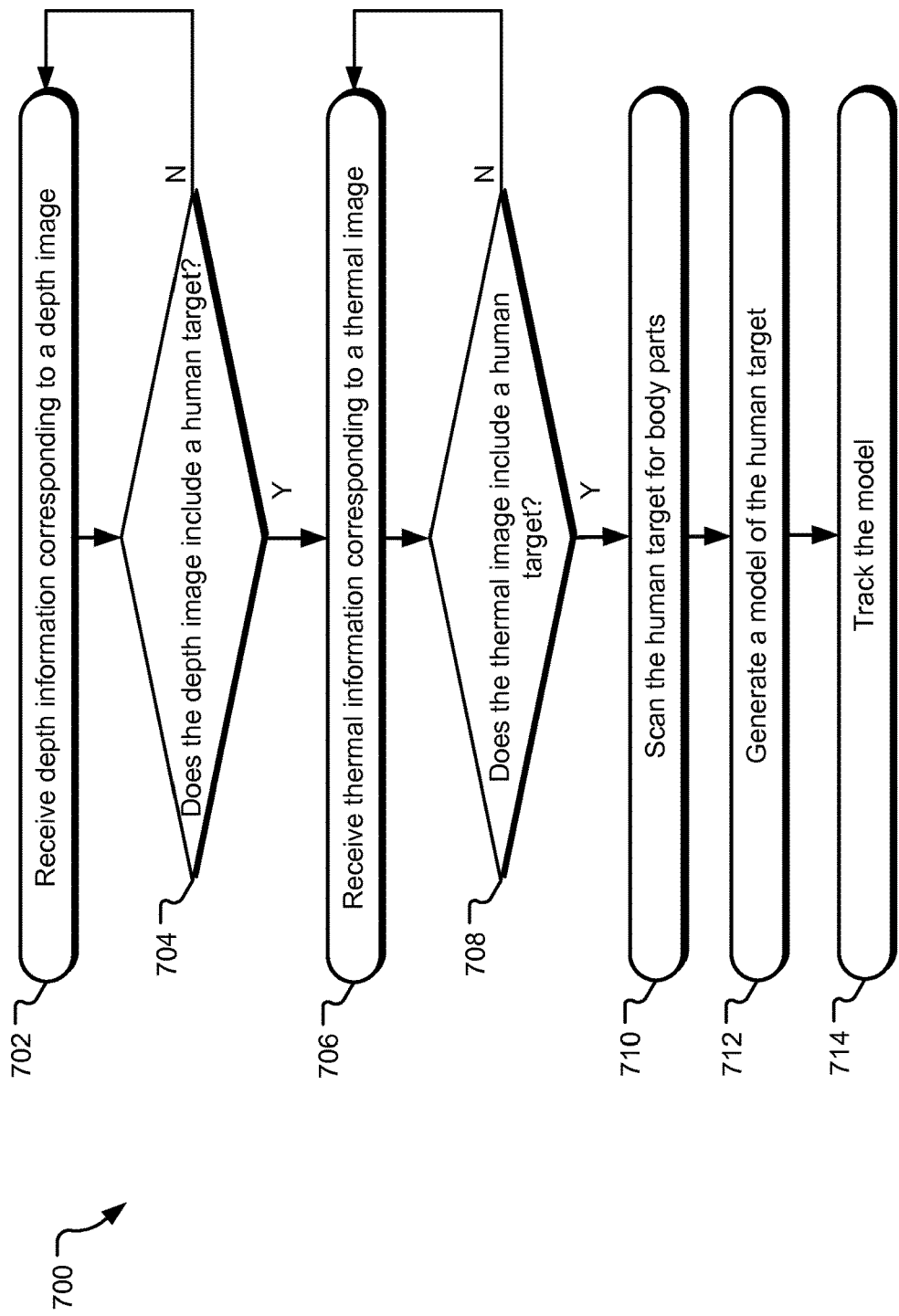
FIG. 7 illustrates example operations for locating and tracking a human user using thermal imaging.

FIG. 7 illustrates example operations 700 for locating and tracking a human user using thermal imaging. In one implementation, the operations 700 are executed by software. However, other implementations are contemplated.

During a receiving operation 702, a depth sensor or an RGB sensor captures depth information that corresponds to a depth image including depth values. Depth information may be captured via any suitable technique including, for example, time-of-flight, structured light, stereo image, etc. An example depth image includes a two-dimensional (2-D) pixel area of the captured scene, wherein each pixel in the 2-D pixel area may represent a distance of an object of interest. In one implementation, the depth information captured by the depth sensor or RGB sensor may be organized into "Z layers" or layers that are perpendicular to a Z-axis extending from the depth sensor along its line of sight. However, other implementations may be employed. At decision operation 704, the depth information is used to determine, with a relatively lower level of confidence, whether a human target is present in the depth image. If a human target is not present in the depth image, processing returns to the receiving operation 702.

If a human target is present in the depth image, a receiving operation 706 receives thermal information corresponding to a thermal image. The thermal image has one or more thermal profiles, which represent the temperature emitted by an object in the form of IR light radiation. Objects with higher temperatures emit more photons during a given time than objects with lower temperatures. Humans have temperatures within a limited range. Accordingly, a decision operation 708 uses thermal information to confirm, with a higher level of confidence, that a human user is present and to filter out objects that do not have a thermal profile that is compatible with a human thermal profile. If a human target is not present in the thermal image, processing returns to the receiving operation 706.

If a human target is detected as present in the thermal image, a scanning operation 710 scans the human target or user identified in the decision operation 708 for body parts using one or more sensors. In one implementation, the resolution of the one or more sensors is increased to distinguish between different body parts of the human user and reduce ambiguity resulting from the human user wearing baggy clothes, a body part of the human user being obstructed, or the user distorting one or more body parts. A generating operation 710 employs the scanned information from the scanning operation 710 to generate a model of the user. The model of the user includes but is not limited to a skeletal model, a mesh human model, or any other suitable representation of the user.

A tracking operation 714 tracks the model of the user such that physical movements or motions of the user may act as a real-time user interface that adjusts and/or controls parameters of an application on a multimedia system via the user interface. For example, the user interface may display a character, avatar, or object associated with an application. The tracked motions of the user may be used to control or move the character, avatar, or object or to perform any other suitable controls of the application.

Figure 8:
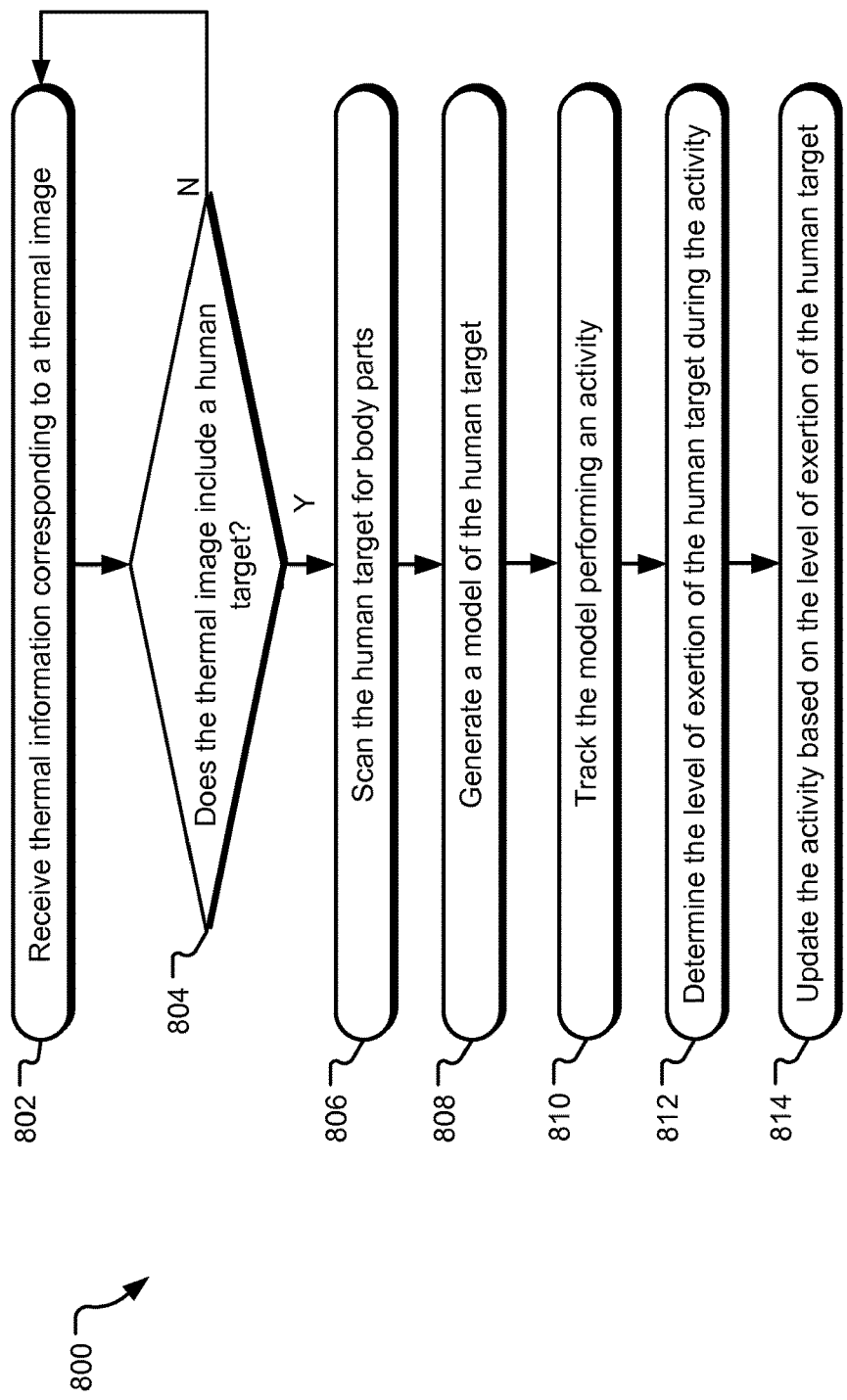
FIG. 8 illustrates example operations for tracking an exertion level of a human user during an activity.

FIG. 8 illustrates example operations 800 for tracking an exertion level of a human user during an activity. In one implementation, the operations 600 are executed by software. However, other implementations are contemplated.

A receiving operation 802 captures thermal information corresponding to a thermal image using a thermal sensor. The thermal image has one or more thermal profiles, which represent the temperature emitted by an object in the form of IR light radiation. Objects with higher temperatures emit more photons during a given time than objects with lower temperatures. Humans have temperatures within a limited range. Accordingly, a decision operation 804 uses the captured thermal information to determine whether a human user is present and to filter out objects that do not have a thermal profile that is compatible with a human thermal profile. If a human target is not present in the thermal image, the processing returns to the receiving operation 802.

If a human target is present in the thermal image, a scanning operation 806 scans the human target or user, identified in the decision operation 804, for body parts using one or more sensors. In one implementation, the resolution of the one or more sensors is increased to distinguish between different body parts of the human user and reduce ambiguity resulting from the human user wearing baggy clothes, a body part of the human user being obstructed, or the user distorting one or more body parts. A generating operation 808 employs the scanned information from the scanning operation 806 to generate a model of the user. The model of the user includes but is not limited to a skeletal model, a mesh human model, or any other suitable representation of the user.

A tracking operation 810 tracks the model of the user such that physical movements or motions of the user may act as a real-time user interface that adjusts and/or controls parameters of an application on a multimedia system via the user interface. For example, the user interface may display a character, avatar, or object associated with an application. The tracked motions of the user may be used to control or move the character, avatar, or object or to perform any other suitable controls of the application.

In one implementation, the user may be moving or performing an activity, such as exercising. A determining operation 812 uses thermal information to monitor a level of exertion of the user, and an update operation 814 dynamically updates an activity level of the user based on the level of exertion. For example, if the determining operation 812 concludes that the level of exertion of the user is too high based on an increasing temperature of the user, the update operation 814 may suggest a break or lower the activity level. Additionally, the updating operation 814 may determine or receive a target level of exertion and update the activity level as the user works towards the target level of exertion.

Figure 9:
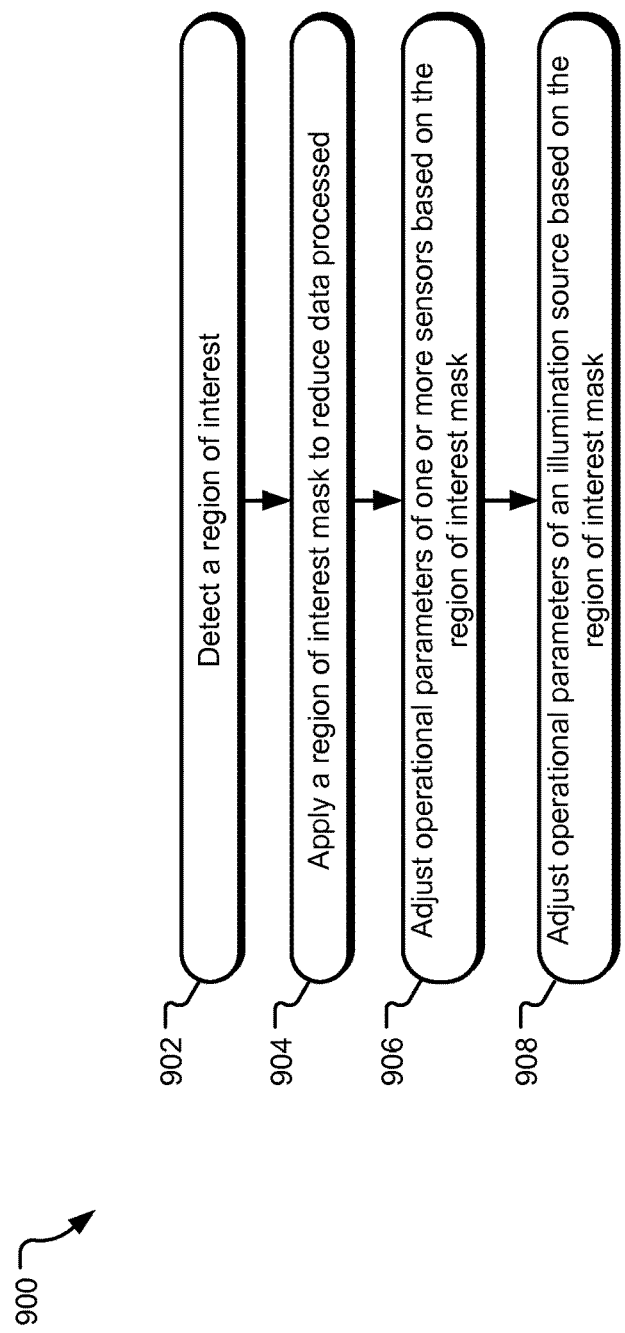
FIG. 9 illustrates example operations for conserving power in a capture device.

FIG. 9 illustrates example operations 900 for conserving power in a capture device. In one implementation, the operations 600 are executed by software. However, other implementations are contemplated.

A detecting operation 902 detects a region of interest as a subset of a field of view of the capture device using one of many possible region of interest determination techniques. For example, the detecting operation 902 may employ a thermal overlay, an electrical overlay, a depth map, and/or an RGB image to detect the region of interest. Based on the region of interest, the capture device may reduce power consumption.

A masking operation 904 applies a region of interest mask to reduce the volume of data processed and/or communicated by the capture device. Reducing the volume of data processed and communicated by the capture device results in less computation needs, which reduces the amount of power consumed by the capture device. In one implementation, the masking operation 904 adjusts the field of view of the capture device based on the region of interest. For example, the field of view of one or more sensors in the capture device may be narrowed or expanded according to the location (e.g., lateral and vertical location and/or distance from a sensor) and/or size of the region of interest. In another implementation, the masking operation 904 reduces or omits raw and/or processed data for points outside the region of interest but within the field of view data by the capture device.

A sensor adjusting operation 906 adjusts the operational parameters of one or more sensors in the capture device based on the region of interest mask. In one implementation, the sensor adjusting operation 906 sets the resolution/sensitivity of a sensor to a high resolution/sensitivity within the region of interest as compared to points outside the region of interest but within the field of view. Reducing the resolution of points within the field of view but outside the region of interest reduces the amount of captured raw data to be processed, thereby reducing the computation performed. The sensor adjusting operation 906 focuses sensor resources, which conserves power in the capture device.

An illumination adjusting operation 908 adjusts the operational parameters of an illumination source based on the region of interest mask. In one implementation, the illumination adjusting operation 908 focuses an illumination field of the capture device on the region of interest. For example, the illumination adjusting operation 908 may keep the illumination intensity constant while narrowing the illumination field to the region of interest. In another implementation, the illumination adjusting operation 908 is based on the sensor adjusting operation 906. For example, the sensor adjusting operation 906 may increase the resolution/sensitivity of a sensor within the region of interest while reducing the resolution/sensitivity of the sensor outside the region of interest within the field of view. Accordingly, based on the increased resolution/sensitivity of a sensor within the region of interest, the illumination adjusting operation 908 may reduce the illumination intensity. Because an illumination source generally consumes a significant amount of power in a capture device, the illumination adjusting operation 908 results in a significant power reduction for the capture device.

Although the example operations 900 for conserving power in a capture device are presented in an order, it should be understood that the operations may be performed in any order, and all operations need not be performed to conserve power in a capture device.

Figure 10:
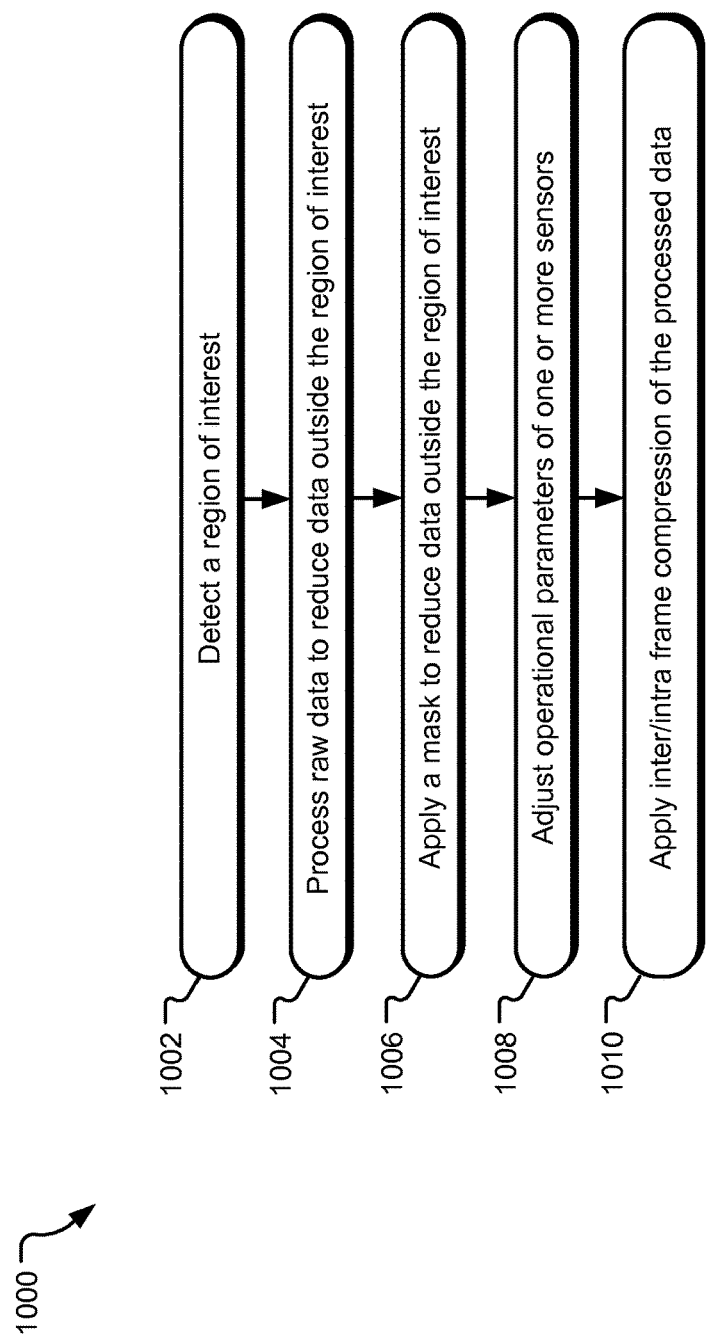
FIG. 10 illustrates example operations for compressing data emitted by a capture device.

FIG. 10 illustrates example operations 1000 for compressing data emitted by a capture device. In one implementation, the operations 600 are executed by software. However, other implementations are contemplated.

A detecting operation 1002 detects a region of interest as a subset of a field of view of the capture device using one of many possible region of interest determination techniques. For example, the detecting operation 1002 may employ a thermal overlay, an electrical overlay, a depth map, and/or an RGB image to detect the region of interest. Based on the region of interest, the capture device may compress data emitted by the capture device.

A processing operation 1004 focuses data processing based on the region of interest to reduce the amount of raw data emitted by the capture device. In one implementation, the processing operation 1004 focuses data processing on raw data corresponding to the region of interest. For example, the processing operation 1004 may omit or reduce raw data for points outside the region of interest but within the field of view raw data. In another implementation, the processing operation 1004 omits or reduces processed data based on the region of interest before the capture device transmits the data. For example, the processing operation may omit or reduce processed data corresponding to points outside the region of interest but within the field of view data processed. The reduction in raw or processed data reduces the volume of data emitted by the capture device.

A masking operation 1006 applies a mask to reduce the volume of data communicated by the capture device. In one implementation, the masking operation 1006 adjusts the field of view of the capture device based on the region of interest. For example, the field of view of one or more sensors in the capture device may be narrowed or expanded according to the location (e.g., lateral and vertical location and/or distance from a sensor) and/or size of the region of interest. However, the masking operation 1006 may employ other data processing techniques to reduce raw or processed data based on the region of interest.

An adjusting operation 1008 adjusts the operational parameters of one or more sensors in the capture device based on the region of interest. In one implementation, the adjusting operation 1008 sets the resolution/sensitivity of a sensor to a high resolution/sensitivity within the region of interest as compared to points outside the region of interest but within the field of view. Reducing the resolution of points within the field of view but outside the region of interest reduces the amount of captured raw data to be processed, thereby reducing the volume of data emitted by the capture device.

A compression operation 1010 applies one or more compression techniques to reduce the volume of data emitted by the capture device. In one implementation, inter frame compression is used to compress the processed data before transmitting. In another implementation, intra frame compression is used to compress the processed data. However, both inter frame and intra frame compression and/or alternative or additional compression techniques may be employed.

Although the example operations 1000 for compressing data emitted by a capture device are presented in an order, it should be understood that the operations may be performed in any order, and all operations need not be performed to compress data.

Figure 11:
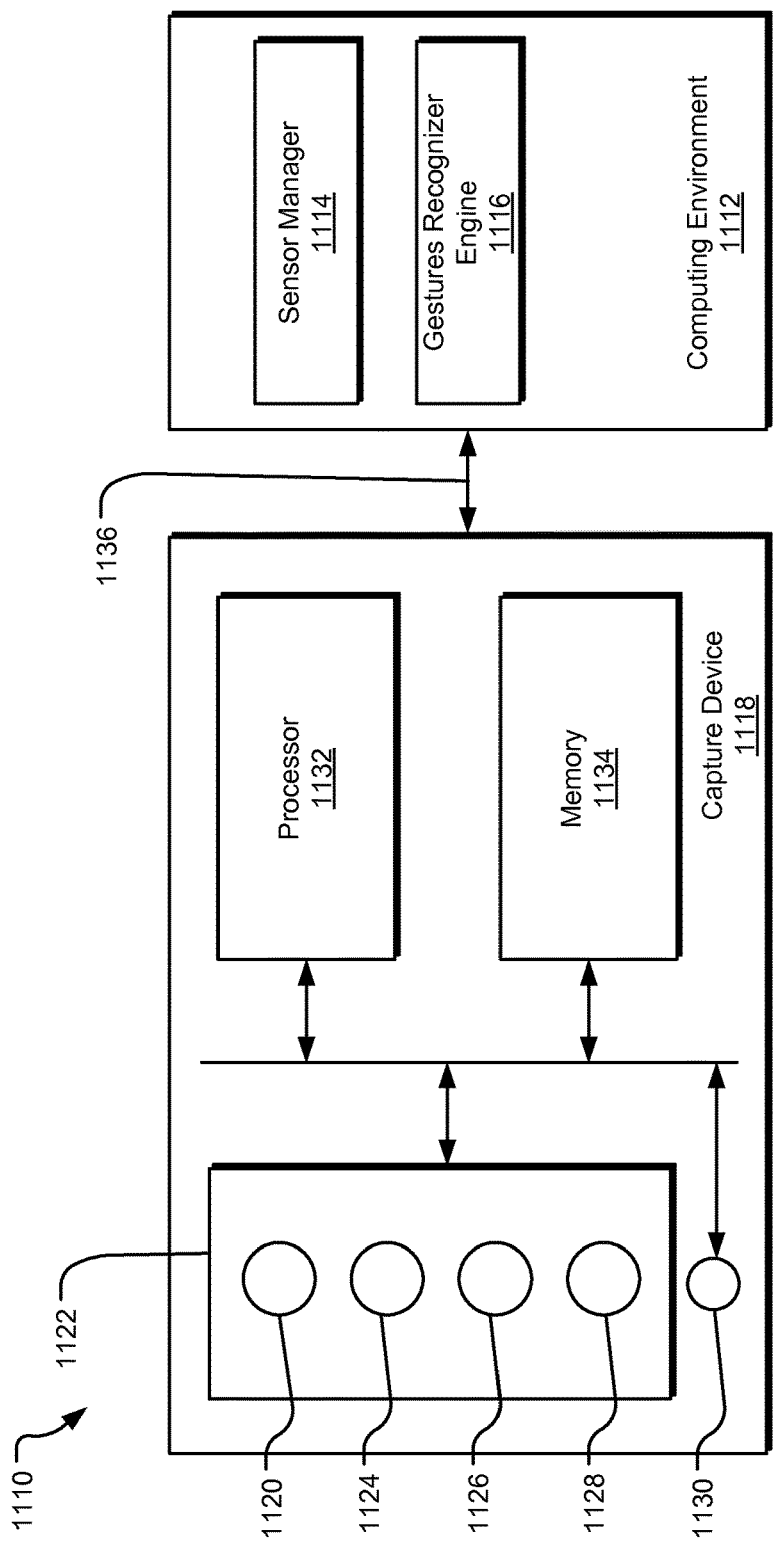
FIG. 11 illustrates an example of implementation of a capture device that may be used in a target recognition, analysis and tracking system.

FIG. 11 illustrates an example of implementation of a capture device 1118 that may be used in a target recognition, analysis and tracking system 1110. According to the example implementation, the capture device 1118 may be configured to capture signals with thermal information including a thermal image that may include one or more thermal profiles, which correspond to the IR light radiated from an object. The capture device 1118 may be further configured to capture signals or video with depth information including a depth image that may include depth values via any suitable technique including, for example, time-of-flight, structured light, stereo image, or the like. According to one implementation, the capture device 1118 organizes the calculated depth information into "Z layers," or layers that are perpendicular to a Z-axis extending from the depth camera along its line of sight, although other implementations may be employed.

As shown in FIG. 11, the capture device 1118 may include a sensor component 1122. According to an example implementation, the sensor component 1122 includes a thermal sensor 1120 that captures the thermal image of a scene and that includes a depth sensor that captures the depth image of a scene. An example depth image includes a two-dimensional (2-D) pixel area of the captured scene, where each pixel in the 2-D pixel area may represent a distance of an object in the captured scene from the camera.

The thermal sensor 1120 may be a passive infrared (IR) sensor operating at far IR light wavelengths. Any object that has a temperature above absolute zero emits energy in the form of IR light radiation, which represents the thermal profile of a particular object. The thermal profiles of different regions or objects may be determined based on the number of photons collected by the thermal sensor 1120 during a given time. Objects or regions with thermal profiles having higher temperatures emit more photons than Objects or regions with thermal profiles having lower temperatures. The thermal information may be used to distinguish objects by analyzing the thermal profiles of detected objects. Based on the thermal information, sensor data corresponding to regions with objects that have a thermal profile outside the temperature range associated with an object of interest may be eliminated to focus data processing.

As shown in FIG. 11, the sensor component 1122 further includes an IR light component 1124, a three-dimensional (3-D) camera 1126, and an RGB camera 1128. For example, in time-of-flight analysis, the IR light component 1124 of the capture device 1118 emits an infrared light onto the scene and then uses sensors (not shown) to detect the backscattered light from the surface of one or more targets and objects in the scene using, for example, the 3-D camera 1126 and/or the RGB camera 1128. In some implementations, pulsed infrared light may be used such that the time between an outgoing light poles and a corresponding incoming light pulse may be measured and used to determine a physical distance from the capture device 1118 to particular locations on the targets or objects in the scene. Additionally, in other example implementations, the phase of the outgoing light wave may be compared to the phase of the incoming light wave to determine a phase shift. The phase shift may then be used to determine a physical distance from the capture device 1118 to particular locations on the targets or objects in the scene.

According to another example implementation, time-of-flight analysis may be used to directly determine a physical distance from the capture device 1118 to particular locations on the targets and objects in a scene by analyzing the intensity of the reflected light beam over time via various techniques including, for example, shuttered light pulse imaging.

In another example implementation, the capture device 1118 uses a structured light to capture depth information. In such an analysis, patterned light (e.g., light projected as a known pattern, such as a grid pattern or a stripe pattern) is projected on to the scene via, for example, the IR light component 1124. Upon striking the surface of one or more targets or objects in the scene, the pattern may become deformed in response. Such a deformation of the pattern is then captured by, for example, the 3-D camera 1126 and/or the RGB camera 1128 and analyzed to determine a physical distance from the capture device to particular locations on the targets or objects in the scene.

According to another example implementation, the capture device 1118 includes two or more physically separate cameras that view a scene from different angles to obtain visual stereo data that may be resolved to generate depth information.

The capture device 1118 may further include a microphone 1130, which includes a transducer or sensor that receives and converts sound into an electrical signal. According to one example implementation, the microphone 1130 is used to reduce feedback between the capture device 1118 and a computing environment 1112 in the target recognition, analysis, and tracking system 1110. Additionally, the microphone 1130 may be used to receive audio signals provided by the user to control applications, such as game occasions, non--game applications, etc. that may be executed in the computing environment 1112, such as a multimedia console.

In an example implementation, the capture device 1118 further includes a processor 1132 in operative communication with the sensor component 1122. The processor 1132 may include a standardized processor, a specialized processor, a microprocessor, etc. that executes processor-readable instructions, including without limitation instructions for receiving the thermal image, receiving the depth image, determining whether a suitable target may be included in the thermal image and/or the depth image, converting the suitable target into a skeletal representation or model of the target, or any other suitable instructions.

The capture device 1118 may further include a memory component 1134 that stores instructions for execution by the processor 1132, signals captured by the thermal sensor 1120, the 3-D camera 1126, or the RGB camera 1128, or any other suitable information, sensor data, images, etc. According to an example implementation, the memory component 1134 may include random access memory (RAM), read-only memory (ROM), cache memory, Flash memory, a hard disk, or any other suitable storage component. As shown in FIG. 11, in one implementation, the memory component 1134 may be a separate component in communication with the image capture component 1122 and the processor 1132. According to another implementation, the memory component 1134 may be integrated into the processor 1132 and/or the image capture component 1122.

Additionally, the capture device 1118 provides the thermal information, the depth information, and the signals captured by, for example, the thermal sensor 1120, the 3-D camera 1126, and/or the RGB camera 1128, and a skeletal model that is generated by the capture device 1118 to the computing environment 1112 via a communication link 1136, such as a wired or wireless network link. The computing environment 1112 then uses the skeletal model, thermal information, depth information, and captured signals to, for example, locate and segment an object or to recognize user gestures and in response control an application, such as a game or word processor.

As shown in FIG. 11, the computing environment 1112 includes a sensor manager 1114 configured to dynamically update and direct the thermal sensor 1120, the 3-D camera 1126, the RGB camera 1128, and/or the IR light component 1124. It should be understood that although the sensor manager 1114 is includes in the computing environment 1112, the sensor manager 1114 may be included in the capture device 1118 or be a separate component in communication with the capture device 1118.

For example, as shown in FIG. 11, the computing environment 1112 further includes gestures recognizer engine 1116. The gestures recognizer engine 1116 includes a collection of gesture filters, each comprising information concerning a gesture that may be performed by the skeletal model (as the user moves). The data captured by the cameras 1126 and 1128, and the capture device 1118 in the form of the skeletal model and movements associated with it may be compared to the gesture filters and the gestures recognizer engine 1116 to identify when a user (as represented by the skeletal model) has performed one or more gestures. These gestures may be associated with various controls of an application. Thus, the computing environment 1112 can use the gestures recognizer engine 1190 to interpret movements of the skeletal model and to control an application based on the movements.

Figure 12:
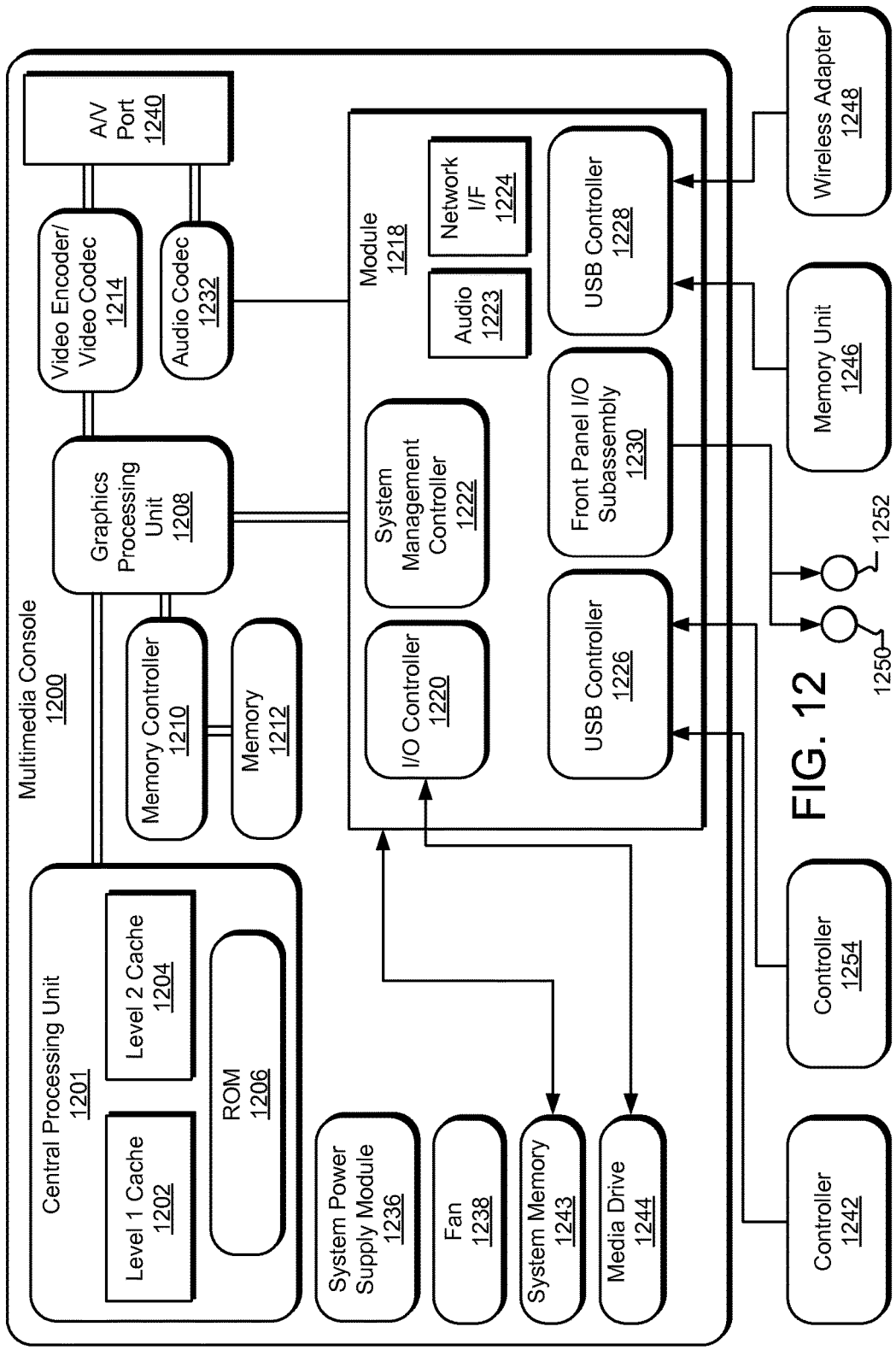
FIG. 12 illustrates an example implementation of a computing environment that may be used to interpret one or more regions of interest in a target recognition, analysis and tracking system.

FIG. 12 illustrates an example implementation of a computing environment that may be used to interpret one or more gestures in a target recognition, analysis and tracking system. The computing environment may be implemented as a multimedia console 1200, such as a multimedia console. The multimedia console 000 has a central processing unit (CPU) 1201 having a level 1 cache 1202, a level 2 cache 1204, and a flash ROM (Read Only Memory) 1206. The level 1 cache 1202 and the level 2 cache 1204 temporarily store data, and hence reduce the number of memory access cycles, thereby improving processing speed and throughput. The CPU 1201 may be provided having more than one core, and thus, additional level 1 and level 2 caches. The flash ROM 1206 may store executable code that is loaded during an initial phase of the boot process when the multimedia console 1200 is powered on.

A graphical processing unit (GPU) 1208 and a video encoder/video codec (coder/decoder) 1214 form a video processing pipe line for high-speed and high-resolution graphics processing. Data is carried from the GPU 1208 to the video encoder/video codec 1214 via a bus. The video-processing pipeline outputs data to an A/V (audio/video) port 1240 transmission to a television or other display. The memory controller 1210 is connected to the GPU 1208 to facilitate processor access to various types of memory 1212, such as, but not limited to, a RAM (Random Access Memory).

The multimedia console 1200 includes an I/O controller 1220, a system management controller 1222, and audio processing unit 1223, a network interface controller 1224, a first USB host controller 1226, a second USB controller 1228 and a front panel I/O subassembly 1230 that are implemented in a module 1218. The USB controllers 1226 and 1228 serve as hosts for peripheral controllers 1242 and 1254, a wireless adapter 1248, and an external memory 1246 (e.g., flash memory, external CD/DVD drive, removable storage media, etc.). The network interface controller 1224 and/or wireless adapter 1248 provide access to a network (e.g., the Internet, a home network, etc.) and may be any of a wide variety of various wired or wireless adapter components, including an Ethernet card, a modem, a Bluetooth module, a cable modem, and the like.

System memory 1243 is provided to store application data that is loaded during the boot process. A media drive 1244 is provide in may come prize a CD/DVD drive, hard drive, or other removable media drive, etc. the media drive 1244 may be internal or external to the multimedia console 1200. Application data may be accessed via the media drive 1244 for execution, playback, etc. by the multimedia console 1200. The media drive 1244 is connected to the I/O controller 1220 via a bus, such as a serial ATA bus or other high-speed connection (e.g., IEEE 1394).

The system management controller 1222 provides a variety of service function related to assuring availability of the multimedia console 1200. The audio processing unit 1223 and an audio codec 1232 form a corresponding audio processing pipeline with high fidelity and stereo processing. Audio data is carried between the audio processing unit 1223 and the audio codec 1232 via a communication link. The audio processing pipeline outputs data to the A/V port 1240 for reproduction by an external audio player or device having audio capabilities.

The front panel I/O sub assembly 1230 supports the functionality of the power button 1250 and the eject button 1252, as well as any LEDs (light emitting diodes) or other indicators exposed on the outer surface of the multimedia console 1200. A system power supply module 1236 provides power to the components of the multimedia console 1200. A fan 1238 cools the circuitry within the multimedia console 1200.

The CPU 1201, GPU 120 the memory controller 1210, and various other components within the multimedia console 1200 are interconnected via one or more buses, including serial and parallel buses, a memory bus, a peripheral bus, and a processor or local bus using any of a variety of bus architectures. By way of example, such bus architectures may include without limitation a Peripheral Component Interconnect (PCI) bus, a PCI-Express bus, etc.

When the multimedia console 1200 is powered on, application data may be loaded from the system memory 1243 into memory 1212 and/or caches 1202, 1204 and executed on the CPU 1201. The application may present a graphical user interface that provides a consistent user interface when navigating to different media types available on the multimedia console 1200. In operation, applications and/or other media contained within the media drive 1244 may be launched and/or played from the media drive 1244 to provide additional functionalities to the multimedia console 1200.

The multimedia console 1200 may be operated as a stand-alone system by simply connecting the system to a television or other display. In the standalone mode, the multimedia console 1200 allows one or more users to interact with the system, watch movies, or listen to music. However, with the integration of broadband connectivity made available through the network interface controller 1224 or the wireless adapter 1248, the multimedia console 1200 may further be operated as a participant in a larger network community.

When the multimedia console 1200 is powered on, a defined amount of hardware resources are reserved for system use by the multimedia console operating system. These resources may include a reservation of memory (e.g., 16 MB), CPU and GPU cycles (e.g., 5%), networking bandwidth (e.g., 8 kb/s), etc. Because the resources are reserved at system boot time, the reserve resources are not available for the application's use. In particular, the memory reservation preferably is large enough to contain the launch kernel, concurrent system applications, and drivers. The CPU reservations are typically constant, such that if the reserve CPU usage is not returned by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory necessary for an overlay depends on the overlay area size, and the overlay may preferably scales with screen resolution. Where a full user interface used by the concurrent system application, the resolution may be independent of application resolution. A scaler may be used to set this resolution, such that the need to change frequency and cause ATV re-sync is eliminated.

After the multimedia console 1200 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications may be scheduled to run on the CPU 1201 at predetermined times and intervals in order to provide a consistent system resource view to the application. The scheduling is to minimize cache disruption for the game application running on the multimedia console 1200.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 1242 and 1254) are shared by gaming applications and system applications. In the illustrated implementation, the input devices are not reserved resources but are to be switched between system applications and gaming applications such that each will have a focus of the device. The application manager preferably controls the switching of input stream, and a driver maintains state information regarding focus switches. Cameras and other capture devices may define additional input devices for the multimedia console 1200.

As previously discussed, while a capture device may perform at least some aspects of the sensor managing and object segmenting functionality, it should be understood that all or a portion of the sensor managing and object segmenting computations may be performed by the multimedia console 1200.

Figure 13:
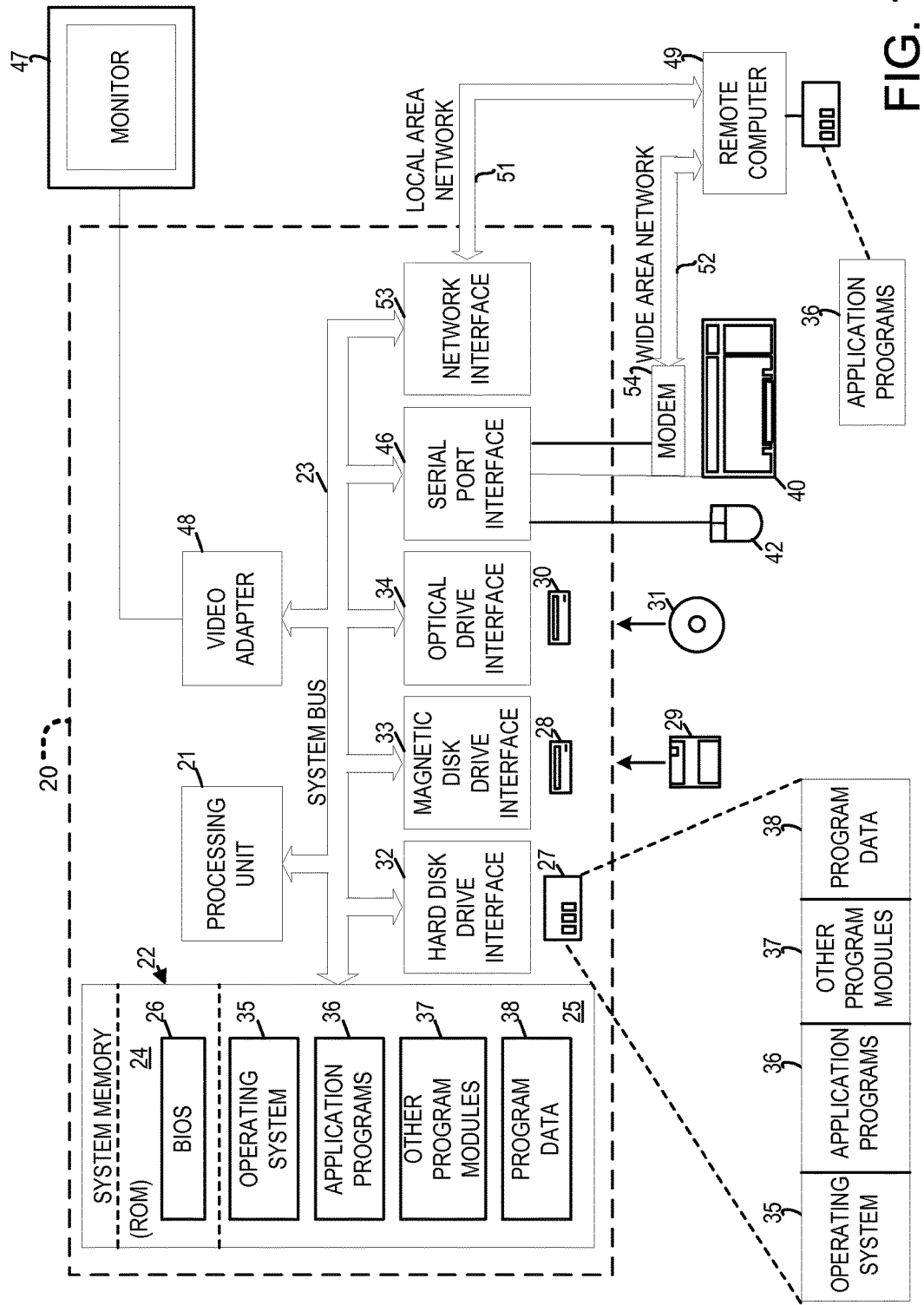
FIG. 13 illustrates an example system that may be useful in implementing the technology described herein.

FIG. 13 illustrates an example system that may be useful in implementing the described technology. The example hardware and operating environment of FIG. 13 for implementing the described technology includes a computing device, such as general purpose computing device in the form of a gaming console, multimedia console, or computer 20, a mobile telephone, a personal data assistant (PDA), a set top box, or other type of computing device. In the implementation of FIG. 13, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program engines and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program engines may be stored on the hard disk, magnetic disk 29, optical disk 31, ROM 24, or RAM 25, including an operating system 35, one or more application programs 36, other program engines 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 13. The logical connections depicted in FIG. 13 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of and communications devices for establishing a communications link between the computers may be used.

In an example implementation, an adjustment module, a sensor manager, a gestures recognition engine, and other engines and services may be embodied by instructions stored in memory 22 and/or storage devices 29 or 31 and processed by the processing unit 21. Sensor signals (e.g., visible or invisible light and sounds), thermal information, depth information, region of interest data, and other data may be stored in memory 22 and/or storage devices 29 or 31 as persistent datastores.

The embodiments of the invention described herein are implemented as logical steps in one or more computer systems. The logical operations of the present invention are implemented (1) as a sequence of processor-implemented steps executing in one or more computer systems and (2) as interconnected machine or circuit engines within one or more computer systems. The implementation is a matter of choice, dependent on the performance requirements of the computer system implementing the invention. Accordingly, the logical operations making up the embodiments of the invention described herein are referred to variously as operations, steps, objects, or engines. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method comprising:
    segmenting a region of interest within a field of view of a target recognition, analysis and tracking system using passive sensing of a first sensor, the region of interest being a subset of the field of view of the target recognition, analysis and tracking system; and
    changing a first operation of data capture by a second sensor within the segmented region of interest of the field of view relative to a second operation of the data capture by the second sensor concurrently collecting data from the field of view outside the segmented region of interest.

2. The method of claim 1 wherein the changing operation comprises:
    changing resolution of capture by the second sensor within the segmented region of interest relative to the field of view outside the segmented region of interest.

3. The method of claim 2 wherein the operation of changing resolution comprises:
    increasing resolution of capture by the second sensor within the segmented region of interest; and
    decreasing resolution of capture by the second sensor within the field for view outside the segmented region of interest.

4. The method of claim 1 wherein the changing operation comprises:
    expanding the field of view of at least one sensor of the target recognition, analysis and tracking system.

5. The method of claim 4 wherein the changing operating further comprises:
    decreasing resolution of capture by the second sensor within the expanded field of view outside the segmented region of interest.

6. The method of claim 1 wherein the changing operation comprises:
    changing sensitivity of capture by the second sensor within the segmented region of interest relative to the field of view outside the segmented region of interest.

7. The method of claim 6 wherein the operation of changing resolution comprises:
    increasing sensitivity of capture by the second sensor within the segmented region of interest; and
    decreasing sensitivity of capture by the second sensor within the field of view outside the segmented region of interest.

8. The method of claim 1 wherein the passive sensing includes passive thermal sensing.

9. A multimedia system comprising:
    a first sensor;
    a second sensor;
    one or more processors; and
    a sensor manager executed by the one or more processors and configured to segment a region of interest within a field of view of the multimedia system using passive sensing of the first sensor, the region of interest being a subset of the field of view of the multimedia system, the sensor manager configured to change a first operation of data capture by the second sensor within the segmented region of interest of the field of view relative to a second operation of the data capture by the second sensor concurrently collecting data from the field of view outside the segmented region of interest.

10. The multimedia system of claim 9 wherein the sensor manager changes the data capture operation of the second sensor by:
    changing resolution of capture by the second sensor within the segmented region of interest relative to the field of view outside the segmented region of interest.

11. The multimedia system of claim 10 wherein the sensor manager changes the data capture operation of the second sensor by:
    increasing resolution of capture by the second sensor within the segmented region of interest; and
    decreasing resolution of capture by the second sensor within the field of view outside the segmented region of interest.

12. The multimedia system of claim 9 wherein the sensor manager changes the data capture operation of the second sensor by:
    expanding the field of view of at least one sensor of the multimedia system.

13. The multimedia system of claim 12 wherein the sensor manager changes the data capture operation of the second sensor by
   decreasing resolution of capture by the second sensor within the expanded field of view outside the segmented region of interest.

14. The multimedia system one or more processor-readable storage media of claim 9 wherein the sensor manager changes the data capture operation of the second sensor by
   changing sensitivity of capture by the second sensor within the segmented region of interest relative to the field of view outside the segmented region of interest.

15. The multimedia system of claim 14 wherein the sensor manager changes the data capture operation of the second sensor by increasing sensitivity of capture by the second sensor within the segmented region of interest and decreasing sensitivity of capture by the second sensor within the field of view outside the segmented region of interest.

16. The multimedia system one of claim 9 wherein the passive sensing includes passive thermal sensing.

17. A system comprising:
   a sensor manager configured to segment a region of interest within a field of view of the system using passive sensing of a first sensor, the region of interest being a subset of the field of view of the system; and
   a second sensor configured to change a resolution of a first operation of data capture within the segmented region of interest of the field of view relative to a resolution of a second operation of data capture by the second sensor concurrently collecting data from the field of view outside the segmented region of interest.

18. The system of claim 17 wherein the second sensor is configured to increase the resolution of the data capture within the segmented region of interest relative to the resolution of the data capture within the field of view outside the segmented region of interest.

19. The system of claim 17 wherein the second sensor is further configured to change a sensitivity of the data capture by the second sensor within the segmented region of interest relative to the sensitivity of the data capture within the field of view outside the segmented region of interest.

20. The system of claim 17 wherein the second sensor is further configured to expand the field of view of at least one sensor.

* * * * *